(12) United States Patent
Kashiwagi et al.

(10) Patent No.: US 12,388,962 B2
(45) Date of Patent: Aug. 12, 2025

(54) PROJECTOR

(71) Applicant: SEIKO EPSON CORPORATION, Tokyo (JP)

(72) Inventors: Akihiro Kashiwagi, Azumino (JP); Akira Momose, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/610,443

(22) Filed: Mar. 20, 2024

(65) Prior Publication Data
US 2024/0323325 A1 Sep. 26, 2024

(30) Foreign Application Priority Data
Mar. 20, 2023 (JP) ................................. 2023-044352

(51) Int. Cl.
*H04N 9/31* (2006.01)
(52) U.S. Cl.
CPC ......... *H04N 9/3152* (2013.01); *H04N 9/3105* (2013.01)
(58) Field of Classification Search
CPC ...... H04N 9/31; H04N 9/3105; H04N 9/3108; H04N 9/3117; H04N 9/3152
USPC ................. 348/744, 759–761, 766, 790, 791
See application file for complete search history.

(56) References Cited

U.S. PATENT DOCUMENTS

| 5,398,125 | A | 3/1995 | Willett et al. |
| 7,213,920 | B2* | 5/2007 | Matsui ................. H04N 5/7416 348/759 |
| 2004/0130684 | A1* | 7/2004 | Kim ..................... H04N 9/3117 353/84 |

FOREIGN PATENT DOCUMENTS

| CN | 212515320 U | 2/2021 |
| JP | H07-191312 A | 7/1995 |
| JP | 2006-227244 A | 8/2006 |

* cited by examiner

*Primary Examiner* — Sherrie Hsia
(74) *Attorney, Agent, or Firm* — Dority & Manning, P.A.

(57) ABSTRACT

A projector according to an aspect includes a light source device configured to emit white light including blue light, green light, and red light, a lens array including a plurality of lenses, a color filter including a blue filter configured to transmit the blue light, a green filter configured to transmit the green light, and a red filter configured to transmit the red light, a pixel electrode including a blue sub-pixel electrode configured to modulate the blue light transmitted through the blue filter according to image information and emit blue image light, a green sub-pixel electrode configured to modulate the green light transmitted through the green filter according to the image information and emit green image light, and a red sub-pixel electrode configured to modulate the red light transmitted through the red filter according to the image information and emit red image light, and a projection optical system configured to project the blue, green, and red image lights. The area of the second lens is larger than the area of the green filter and is larger than the area of the first lens and the area of the third lens.

9 Claims, 9 Drawing Sheets

PROJECTOR

The present application is based on, and claims priority from JP Application Serial Number 2023-044352, filed Mar. 20, 2023, the disclosure of which is hereby incorporated by reference herein in its entirety.

BACKGROUND

1. Technical Field

The present disclosure relates to a projector.

2. Related Art

In recent years, there has been known a projector including one liquid crystal panel as a light modulation device that generates, from color light, image light having a color of the color light, that is, a single plate type projector. For example, Chinese Utility Model Registration No. 212515320 (CN-UM-212515320) discloses a single plate type projector in which a light emitting diode (LED) is used as a light source. In the projector disclosed in CN-UM-212515320, a reflector, a reflection mirror, a collimate lens, a liquid crystal display functioning as a light modulation device, a condensing lens, and the like are disposed on an optical path of light emitted from an LED light source.

JP-A-7-191312 discloses a single plate type projector including a liquid crystal display functioning as a light modulation device and two microlens arrays. The liquid crystal display of the projector disclosed in JP-A-7-191312 includes a plurality of pixels between two transparent substrates. The plurality of pixels are arrayed at predetermined intervals in a direction parallel to plate surfaces of the transparent substrates. The two microlens arrays are disposed on an incident surface and an emission surface of the liquid crystal display. Light made incident on the liquid crystal display is collimated and is condensed on the pixels by microlenses of the microlens arrays disposed on the incident surface of the liquid crystal display. The light condensed on the pixels is modulated according to image information and emitted from the pixels as image lights. The lights emitted from the pixels are collimated by the microlenses of the microlens array disposed on the emission surface of the liquid crystal display.

In the single plate type projectors disclosed in CN-UM-212515320 and JP-A-7-191312, light amount differences among red, green, blue color image lights generated by the liquid crystal display are not particularly considered. In the projector disclosed in JP-A-7-191312, differences among diameters of a plurality of microlenses for the plurality of pixels are not examined either. However, a human who is an observer observing an image and a video projected from the projector perceives green light with a wavelength near 555 nm as the strongest and brightest in a bright place such as the interior. Therefore, there has been a demand for measures for realizing, according to the visibility of a human observing the brightness of an image and a video projected from a projector, an image and a video visually recognized more brightly than an image and a video projected by the projectors of the related art.

SUMMARY

According to an aspect of the present disclosure, a projector includes: a light source device configured to emit white light including blue light, green light, and red light; a lens array disposed on an optical path of the white light emitted from the light source device and including a plurality of lenses; a color filter disposed on an optical path of the white light emitted from the lens array and including a blue filter configured to transmit the blue light, a green filter configured to transmit the green light, and a red filter configured to transmit the red light; a pixel electrode disposed to face the color filter and including a blue sub-pixel electrode configured to modulate the blue light transmitted through the blue filter according to image information and emit blue image light, a green sub-pixel electrode configured to modulate the green light transmitted through the green filter according to the image information and emit green image light, and a red sub-pixel electrode configured to modulate the red light transmitted through the red filter according to the image information and emit red image light; and a projection optical system disposed on traveling paths of the blue image light, the green image light, and the red image light and configured to project the blue image light, the green image light, and the red image light. The plurality of lenses include a first lens that emits the white light toward the blue filter, a second lens that emits the white light toward the green filter, and a third lens that emits the white light toward the red filter. An area of the second lens is larger than an area of the green filter and is larger than an area of the first lens and an area of the third lens.

DESCRIPTION OF EMBODIMENTS

Figure 1:
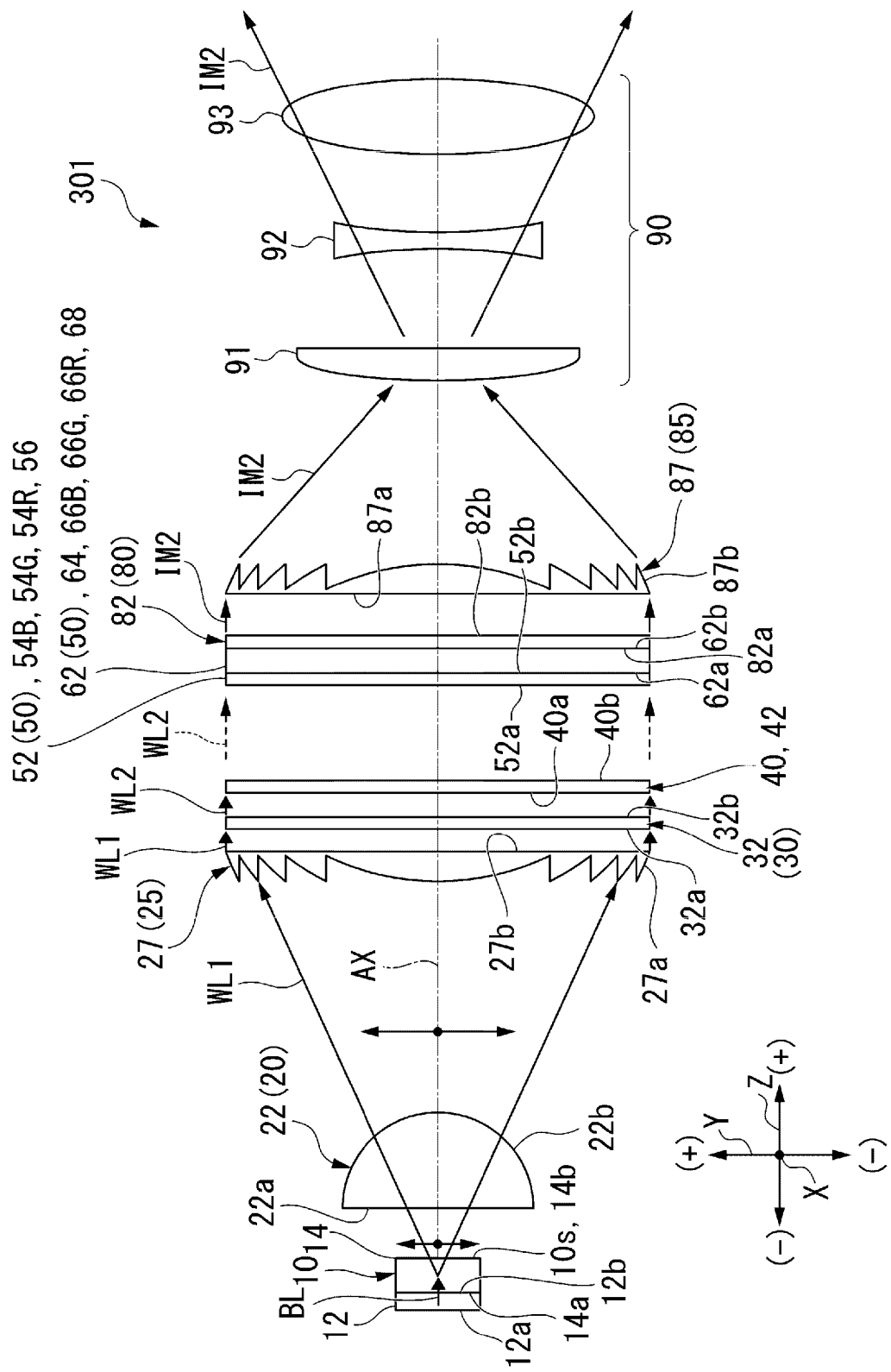
FIG. 1 is a schematic diagram showing a configuration of a projector in an embodiment.

An embodiment of the present disclosure is explained below with reference to the drawings. In the drawings, scales of dimensions are sometimes changed depending on components in order to clearly show the components.

First, the embodiment of the present disclosure is explained with reference to FIGS. 1 to 5. FIG. 1 is a schematic diagram showing a configuration of a projector 301 in the embodiment of the present disclosure. The projector 301 is an image display apparatus including one liquid crystal panel as a light modulation device and is a so-called single plate type projector. As shown in FIG. 1, the projector 301 includes a light source device 10, a pickup optical system 20, a collimating lens 25, an incident-side polarizing plate 30, a lens array 40, a light modulation device 50, an emission-side polarizing plate 80, a condensing lens 85, and a projection optical system 90.

As shown in FIG. 1, the light source device 10 includes a light emitting element 12 and a wavelength conversion element 14. The light emitting element 12 is provided on a plate surface of a not-shown substrate. The light emitting element 12 is formed in a plate shape or a layer shape and includes plate surfaces 12a and 12b. A plan view shape of the plate surfaces 12a and 12b is, for example, a rectangle.

The light emitting element 12 emits blue light BL from the plate surface 12a and a part of side surfaces. A peak wavelength of the blue light BL is included in, for example, a range of 455 nm to 465 nm. Note that a light emission wavelength band of the light emitting element 12 is, for example, 445 nm to 475 nm but is not limited to the wavelength band and only has to be a wavelength band including a wavelength of a blue component of image lights IM1 and IM2 explained below and an excitation wavelength of the wavelength conversion element 14. The light emitting element 12 is, for example, a blue light emitting diode (LED).

The wavelength conversion element 14 is provided on the plate surface 12b of the light emitting element 12 and stacked on the light emitting element 12. The wavelength conversion element 14 has the same plan view shape and the same size as the plan view shape and the size of the light emitting element 12, is formed in a plate shape or a layer shape, and includes plate surfaces 14a and 14b. The plate surface 14a of the wavelength conversion element 14 is in contact with the plate surface 12b of the light emitting element 12.

The blue light BL emitted from the plate surface 12b of the light emitting element 12 is made incident on the wavelength conversion element 14 from the plate surface 12b. The wavelength conversion element 14 is excited by at least a part of the incident blue light BL and emits yellow light YL from the plate surface 14b as fluorescent light. A peak wavelength of the yellow light YL is included in, for example, a range of 530 nm to 570 nm. That is, the yellow light YL is light having a wavelength different from the wavelength of the blue light BL and having a color different from the color of the blue light BL. Specifically, the yellow light YL includes green light and red light and is color light for generating full-color image lights IM1 and IM2 in conjunction with the blue light BL.

At least a part of the remainder of the blue light BL made incident on the wavelength conversion element 14 is transmitted through the wavelength conversion element 14 and emitted from the plate surface 14b. The wavelength conversion element 14 is formed by, for example, an yttrium aluminum garnet (YAG)-based ceramics phosphor and is, for example, YAG activated by cerium (Ce) (YAG:Ce$^{3+}$). Note that the wavelength conversion element 14 may be formed by one kind of a material or may be formed by a material obtained by mixing particles formed by two or more kinds of fluorescent materials.

The blue light BL and the yellow light YL emitted from the plate surface 14b of the wavelength conversion element 14 are combined and white light WL1 is generated. That is, the wavelength conversion element 14 emits the white light WL1 from the plate surface 14b.

In the following explanation and the drawings referred to below, an axis parallel to an optical axis AX of the white light WL1 emitted from the plate surface 14b of the wavelength conversion element 14 is described as Z axis. One side of the Z axis is described as +Z side and the other side of the Z axis is described as −Z side. An axis orthogonal to the Z axis is described as X axis. One side of the X axis is described as +X side and the other side of the X axis is described as −X side. An axis orthogonal to the X axis and the Z axis is described as Y axis. One side of the Y axis is described as +Y side and the other side of the Y axis is described as −Y side. A surface orthogonal to the Z axis and including the X axis and the Y axis is described as XY plane.

The plate surfaces 12a and 12b of the light emitting element 12 and the plate surfaces 14a and 14b of the wavelength conversion element 14 are disposed in parallel to the XY plane. The plate surface 14b of the wavelength conversion element 14 configures an emission surface 10s of the light source device 10. A light emission surface of the light source device 10 is equal to the area of the plate surface 14b of the wavelength conversion element 14.

The light source device 10 emits the white light WL1 from the emission surface 10s to the +Z side along the Z axis. The white light WL1 emitted from the light source device 10 is diverging light that spreads in the XY plane as the diverging light travels from the plate surface 14b of the wavelength conversion element 14 to the +Z side along the Z axis. The white light WL1 is not specific polarized light but is nonpolarized light and is, for example, random polarized light. In FIG. 1, polarized light parallel to the X axis and polarized light parallel to the Y axis among polarized lights included in the white light WL1 are shown.

The pickup optical system 20 is disposed on an optical path of the white light WL1 emitted from the light source device 10. The pickup optical system 20 is disposed further on the +Z side than the light source device 10 and disposed at an interval from the light source device 10 on the Z axis. Between the light source device 10 and the pickup optical system 20, the white light WL1 travels along the Z axis and is not deflected. Therefore, the pickup optical system 20 is disposed within a range including the light source device 10 on the X axis and the Y axis. The pickup optical system 20 moderately enlarges a beam diameter on the XY plane of the white light WL1 made incident thereon and emits the white light WL1 having a desired beam diameter to the +Z side along the Z axis.

The pickup optical system 20 is configured with, for example, one plano-convex lens 22. The center on the X axis and the Y axis of the plano-convex lens 22 is disposed on the optical axis AX of the white light WL1. An incident surface 22a of the plano-convex lens 22 is a flat surface parallel to the XY plane. An emission surface 22b of the plano-convex lens 22 is a curved surface convex to the +Z side. A diameter of the plano-convex lens 22 and a shape of the emission surface 22b are designed as appropriate according to a radiation characteristic, a spread angle, a divergence degree, and the like of the white light WL1 made incident on the pickup optical system 20.

Note that the pickup optical system 20 may be configured with an optical element capable of generating the white light WL1 having the desired beam diameter as explained above, may be configured with, for example, a biconvex lens or an aspherical lens instead of the plano-convex lens 22, or may be an optical system obtained by combining a plurality of optical lenses.

The collimating lens 25 is disposed on an optical path of the white light WL1 emitted from the pickup optical system 20. The collimating lens 25 is disposed further on the +Z side than the pickup optical system 20 and disposed at an interval from the pickup optical system 20 on the Z axis. Between the pickup optical system 20 and the collimating lens 25, the white light WL1 travels along the Z axis and is not deflected. Therefore, the collimating lens 25 is disposed within a range including the light source device 10 on the X axis and the Y axis. The collimating lens 25 collimates the white light WL1 made incident thereon and emits the collimated white light WL1 to the +Z side along the Z axis.

The collimating lens 25 is configured with, for example, a Fresnel lens 27. The center on the X axis and the Y axis of the Fresnel lens 27 is disposed on the optical axis AX. An incident surface 27a of the Fresnel lens 27 is a surface obtained by deleting an equal phase component of a lens curved surface designed according to a beam diameter and an intensity distribution on the XY plane of the white light WL1 and a distance on the Z axis from a light emission position of the white light WL1 to the incident surface 27a in the light source device 10. The thickness of the equal phase component depends on a center wavelength of the white light WL1 and a refractive index of the Fresnel lens 27. When viewed along the Z axis, the surface obtained as explained above is disposed on the incident surface 27a in a concentric shape on the XY plane. In the Fresnel lens 27, the difference between an inner diameter and an outer diameter centering on the optical axis AX of the lens curved surface divided by the thickness of the equal phase component decreases further away in the radial direction from the optical axis AX. An emission surface 27b of the Fresnel lens 27 is a flat surface parallel to the XY plane.

Note that the collimating lens 25 is configured with an optical element capable of collimating the white light WL1 as explained above and may be configured with, for example, a plano-convex lens or an aspherical lens instead of the Fresnel lens 27. A beam region of the white light WL1 emitted from the collimating lens 25 includes a modulation region of the light modulation device 50 explained below on the XY plane. The modulation region means a region where a plurality of pixels 64 of a pixel electrode 62 of the light modulation device 50 are disposed. Based on this, the collimating lens 25 has a diameter equal to or larger than dimensions on the X axis and the Y axis of the modulation region of the light modulation device 50 included in the single plate type projector 301. Since the Fresnel lens 27 is used as the collimating lens 25, the thickness on the Z axis of the collimating lens 25 is moderately suppressed.

The incident-side polarizing plate 30 is disposed on an optical path of the white light WL1 emitted from the collimating lens 25. The incident-side polarizing plate 30 is disposed further on the +Z side than the collimating lens 25 and disposed at an interval from the collimating lens 25 on the Z axis. Between the collimating lens 25 and the incident-side polarizing plate 30, the white light WL1 travels along the Z axis and is not deflected. Therefore, the incident-side polarizing plate 30 is disposed within the same range as the range of the collimating lens 25 on the X axis and the Y axis. The incident-side polarizing plate 30 emits white light WL2, which is predetermined polarized light, in the white light WL1 made incident thereon. The predetermined polarized light is, for example, P-polarized light or S-polarized light.

The incident-side polarizing plate 30 is, for example, an absorption type polarizing plate 32 having sensitivity in a visible wavelength band. The center on the X axis and the Y axis of the polarizing plate 32 is disposed on the optical axis AX. An incident surface 32a and an emission surface 32b of the polarizing plate 32 are parallel to the XY plane.

The lens array 40 is disposed on an optical path of the white light WL2 emitted from the incident-side polarizing plate 30. The lens array 40 is disposed further on the +Z side than the incident-side polarizing plate 30 and disposed at an interval from the incident-side polarizing plate 30 on the Z axis. Between the incident-side polarizing plate 30 and the lens array 40, the white light WL2 travels along the Z axis and is not deflected. Therefore, the lens array 40 is disposed within the same range as the range of the incident-side polarizing plate 30 on the X axis and the Y axis. The lens array 40 divides the white light WL2 into a plurality of very small regions on the XY plane and condenses the white light WL2 in each of the very small regions.

The lens array 40 includes a plurality of microlenses 42 provided in the plurality of very small regions. The plurality of microlenses 42 are disposed side by side along the X axis and the Y axis. An incident surface 40a of the lens array 40 is configured with incident surfaces of the plurality of microlenses 42. An emission surface 40b of the lens array 40 is a flat surface parallel to the XY plane. The plurality of microlenses 42 are explained below. Note that, in FIG. 1, the plurality of microlenses 42 are omitted.

The light modulation device 50 is disposed on an optical path of the white light WL2 emitted from the lens array 40. The light modulation device 50 is disposed further on the +Z side than the lens array 40 and disposed at an interval from the lens array 40 on the Z axis. Between the lens array 40 and the light modulation device 50, the white light WL2 travels along the Z axis and is not deflected. Therefore, the light modulation device 50 is disposed within the same range as the range of the lens array 40 on the X axis and the Y axis. The light modulation device 50 modulates the white light WL2 made incident thereon according to an electric signal input from a not-shown image output device provided on the outside of the projector 301 and generates the full-color image lights IM1 and IM2.

The light modulation device 50 is configured with a color filter 52 and the pixel electrode 62. The color filter 52 is formed in a plate shape. The center on the X axis and the Y axis of the color filter 52 and the center on the X axis and the Y axis of the pixel electrode 62 are disposed on the optical axis AX. An incident surface 52a and an emission surface 52b of the color filter 52 are parallel to the XY plane. The incident surface 52a of the color filter 52 faces the emission surface 40b of the lens array 40.

The color filter 52 includes a plurality of blue filters 54B, a plurality of green filters 54G, a plurality of red filters 54R, and a light blocking region 56. The blue filters 54B transmit the blue light in the white light WL2 made incident thereon. The green filters 54G transmit the green light in the white light WL2 made incident thereon. A peak wavelength of the green light is included in, for example, a range of 520 nm to 570 nm. The red filters 54R transmit the red light in the white light WL2 made incident thereon. A peak wavelength of the red light is included in, for example, a range of 590 nm to 640 nm. The light blocking region 56 blocks the white light WL2 made incident thereon and does not transmit all of the blue light, the green light, and the red light.

The pixel electrode 62 is thicker than the color filter 52 and is generally formed in a plate shape. An incident surface 62a and an emission surface 62b of the pixel electrode 62 are parallel to the XY plane. The incident surface 62a of the pixel electrode 62 is in contact with the emission surface 52b of the color filter 52.

The pixel electrode 62 includes the plurality of pixels 64. The plurality of pixels 64 are disposed side by side along the X axis and the Y axis. The pixels 64 include blue sub-pixel electrodes 66B, green sub-pixel electrodes 66G, and red sub-pixel electrodes 66R. Relative disposition of the blue filters 54B, the green filters 54G, the red filters 54R, and the light blocking region 56 of the color filter 52 and relative disposition of the blue sub-pixel electrodes 66B, the green sub-pixel electrodes 66G, and the red sub-pixel electrodes 66R of the plurality of pixels 64 of the pixel electrode 62 with respect to a first lens, a second lens, and a third lens of the lens array 40 are explained below.

The not-shown image output device is electrically connected to the pixel electrode 62. The image output device is, for example, a computer or a tablet terminal. An electric signal supplied from the image output device to the pixel electrode 62 is converted into, by a circuit, a wire, and the like not shown in FIG. 1 included in the pixel electrode 62, an electric signal corresponding to a modulation amount of color light to be modulated by each of the blue sub-pixel electrodes 66B, the green sub-pixel electrodes 66G, and the red sub-pixel electrodes 66R of the respective pixels 64 and is supplied to the color sub-pixel electrodes.

The blue sub-pixel electrodes 66B, the green sub-pixel electrodes 66G, and the red sub-pixel electrodes 66R include, for example, switching elements configured with polysilicon thin film transistors (TFTs). The blue sub-pixel electrodes 66B change, according to an operation of the switching elements corresponding to an electric signal input from the image output device, a polarization direction of the blue light transmitted through the color filters 54B. Consequently, the blue sub-pixel electrodes 66B modulate the blue light made incident thereon and emit blue image light. The green sub-pixel electrodes 66G change, according to an operation of the switching elements corresponding to an electric signal input from the image output device, a polarization direction of the green light transmitted through the green filters 54G. Consequently, the green sub-pixel electrodes 66G modulate the green light made incident thereon and emit green image light. The red sub-pixel electrodes 66R change, according to an operation of the switching elements corresponding to an electric signal input from the image output device, a polarization direction of the red light transmitted through the red filters 54R. Consequently, the red sub-pixel electrodes 66R modulate the red light made incident thereon and emit red image light.

The blue image light emitted from the blue sub-pixel electrodes 66B of the pixel electrode 62, the green image light emitted from the green sub-pixel electrodes 66G of the pixel electrode 62, and the red image light emitted from the red sub-pixel electrodes 66R of the pixel electrode 62 are combined for each of the pixels to be full-color image light IM1. The image light IM1 is omitted in FIG. 1. The image light IM1 is explained below.

The emission-side polarizing plate 80 is disposed on an optical path of the full-color image light IM1 emitted from the light modulation device 50. The emission-side polarizing plate 80 is disposed further on the +Z side than the pixel electrode 62 of the light modulation device 50 and is in contact with the light modulation device 50. The emission-side polarizing plate 80 is disposed within the same range as the range of the light modulation device 50 on the X axis and the Y axis. The emission-side polarizing plate 80 emits the image light IM2, which is predetermined polarized light, in the full-color image light IM1 made incident from the light modulation device 50.

The emission-side polarizing plate 80 is, for example, an absorption type polarizing plate 82 having sensitivity in a visible wavelength band. The center on the X axis and the Y axis of the polarizing plate 82 is disposed on the optical axis AX. An incident surface 82a and an emission surface 82b of the polarizing plate 82 are parallel to the XY plane. The incident surface 82a of the polarizing plate 82 is in contact with the emission surface 62b of the pixel electrode 62.

The condensing lens 85 is disposed on an optical path of the image light IM2 emitted from the emission-side polarizing plate 80. The condensing lens 85 is disposed further on the +Z side than the emission-side polarizing plate 80 and disposed at an interval from the emission-side polarizing plate 80 on the Z axis. Between the emission-side polarizing plate 80 and the condensing lens 85, the image light IM2 travels along the Z axis and is not deflected. Therefore, the condensing lens 85 is disposed within the same range as the range of the emission-side polarizing plate 80 on the X axis and the Y axis. The condensing lens 85 emits the image light IM2 made incident thereon to the +Z side along the Z axis and condenses the image light IM2 on the optical axis AX.

The condensing lens 85 is configured with, for example, a Fresnel lens 87. The center on the X axis and the Y axis of the Fresnel lens 87 is disposed on the optical axis AX. An incident surface 87a of the Fresnel lens 87 is a flat surface parallel to the XY plane. An emission surface 87b of the Fresnel lens 87 is a surface obtained by deleting an equal phase component of a lens curved surface designed according to a beam diameter and an intensity distribution of the image light IM2 and a distance on the Z axis from the emission surface 87b to the image light IM2 in the projection optical system 90. When viewed along the Z axis, the surface obtained as explained above is disposed on the emission surface 87b in a concentric shape on the XY plane. In the Fresnel lens 87, the difference between an inner diameter and an outer diameter centering on the optical axis AX of the lens curved surface divided by the thickness of the equal phase component decreases further away in the radial direction from the optical axis AX.

Note that the condensing lens 85 may be configured with an optical element capable of condensing the image light IM2 as explained above and configured with, for example, a biconvex lens or an aspherical lens instead of the Fresnel lens 87. A beam region of the image light IM2 made incident on the condensing lens 85 includes a modulation region of the light modulation device 50 on the XY plane. Based on this, the collimating lens 85 has a diameter equal to or larger than dimensions on the X axis and the Y axis of the modulation region of the light modulation device 50. Since the Fresnel lens 87 is used as the condensing lens 85, the thickness on the Z axis of the condensing lens 85 is moderately suppressed.

The projection optical system 90 is disposed on an optical path of the image light IM2 condensed on the optical axis AX by the condensing lens 85. The projection optical system 90 is disposed further on the +Z side than the condensing lens 85 and disposed at an interval from the condensing lens 85 on the Z axis. The projection optical system 90 projects the image light IM2 condensed by the condensing lens 85 to the +Z side along the Z axis and enlarges and displays the image light IM2 on a not-shown screen or the like.

The projection optical system 90 includes, for example, a plano-convex lens 91, a biconcave lens 92, and a biconvex lens 93. The center on the X axis and the Y axis of the plano-convex lens 91, the center on the X axis and the Y axis of the biconcave lens 92, and the center on the X axis and the Y axis of the biconvex lens 93 are disposed on the optical axis AX. An incident surface of the plano-convex lens 91 is a curved surface convex to the −Z side. An emission surface of the plano-convex lens 91 is a flat surface parallel to the XY plane. An incident surface of the biconcave lens 92 is a curved surface concave to the +Z side. An emission surface of the biconcave lens 92 is a curved surface concave to the −Z side. An incident surface of the biconvex lens 93 is a curved surface convex to the −Z side. An emission surface of the biconvex lens 93 is a curved surface convex to the +Z side. A shape of the incident surface and a shape of the emission surface of each of the plano-convex lens 91, the biconcave lens 92, and the biconvex lens 93 are designated as appropriate according to a radiation characteristic, a spread angle, and a divergence degree of the image light IM2 made incident on the projection optical system 90, a separation distance between the projection optical system 90 and a display surface of the screen on the Z axis, magnification of the image light IM2 when being projected onto the screen from the projection optical system 90, and the like.

Note that the projection optical system 90 may be configured with an optical element capable of enlarging, at predetermined magnification, the image light IM2 made incident thereon as explained above and projecting the image light IM2 and may include another optical lens instead of at least one lens of the plano-convex lens 91, the biconcave lens 92, and the biconvex lens 93. The projection optical system 90 may be configured with one optical lens or may be configured with four or more optical lenses. The optical lenses include, for example, a plano-convex lens, a plano-concave lens, a biconvex lens, a biconcave lens, a meniscus lens, an aspherical lens, and a free curved surface lens.

Subsequently, relative disposition of the blue filters 54B, the green filters 54G, the red filters 54R, and the light blocking region 56 of the color filter 52 and relative disposition of the blue sub-pixel electrodes 66B, the green sub-pixel electrodes 66G, and the red sub-pixel electrodes 66R of the plurality of pixels 64 of the pixel electrode 62 with respect to the first lens, the second lens, and the third lens of the lens array 40 are explained.

Figure 2:
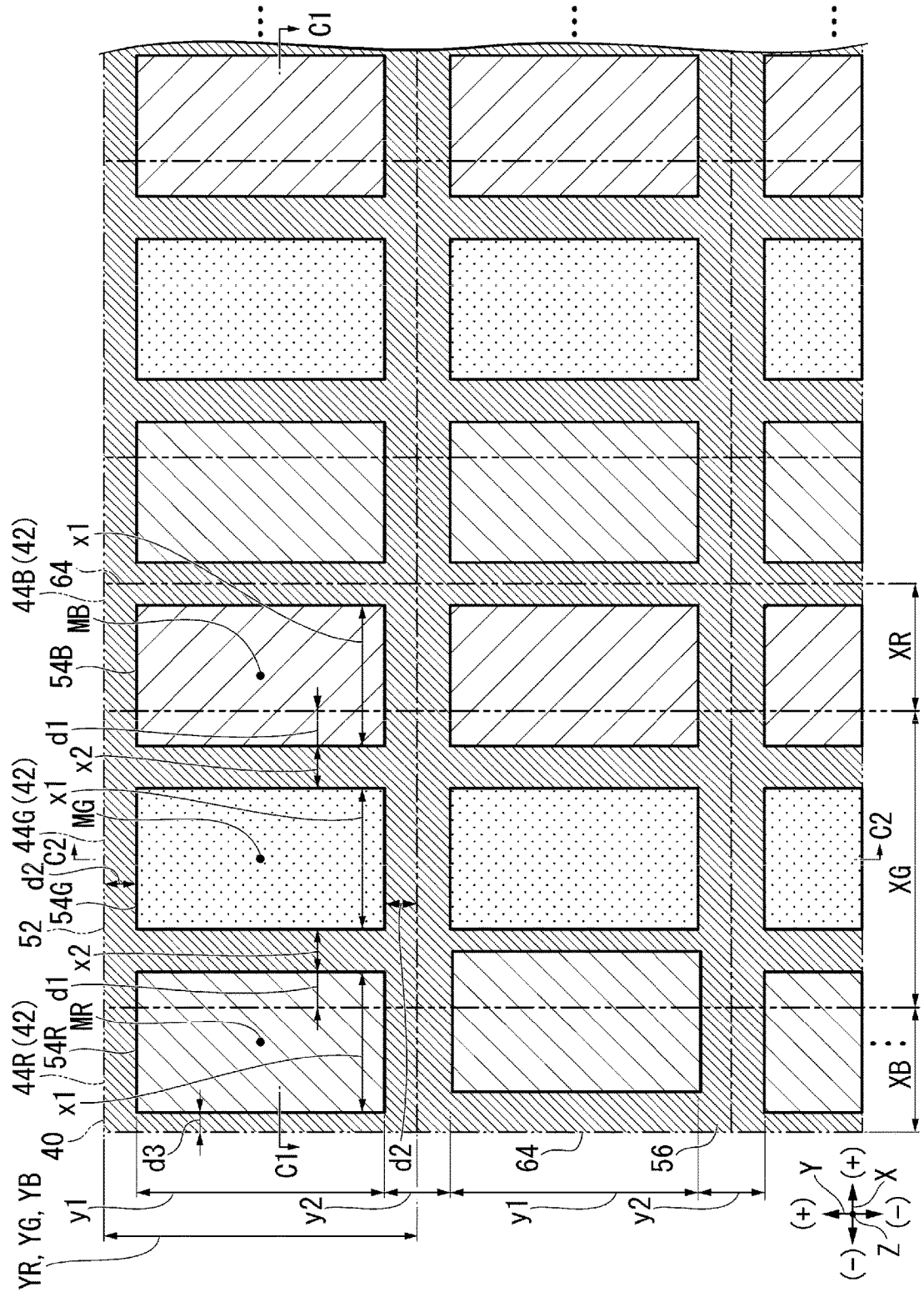
FIG. 2 is a schematic diagram of a lens array and a color filter of a light modulation device of the projector shown in FIG. 1.

FIG. 2 is a schematic diagram of the lens array 40 and the color filter 52 of the light modulation device 50 and is a front view of the lens array 40 and the color filter 52 when viewed from the −Z side along the Z axis. However, the peripheral edges of the microlenses 42 of the lens array 40 is indicated by alternate long and two short dashes lines in order to clearly show the configuration of the color filter 52.

As shown in FIG. 2, a shape of each of the red filter 54R, the green filter 54G, and the blue filter 54B of the color filter 52 when viewed along the Z axis is a rectangle. The widths of the red filter 54R, the green filter 54G, and the blue filter 54B on the X axis are equal to one another and are x1. The widths of the red filter 54R, the green filter 54G, and the blue filter 54B on the Y axis are equal to one another and are y1. The width y1 is larger than the width x1 and is, for example, 140% to 180% of the width x1. Note that, in this specification, "width on the X axis" means a dimension on an axis parallel to the X axis and "width on the Y axis" means a dimension on an axis parallel to the Y axis.

In the color filter 52, the plurality of red filters 54R, the plurality of green filters 54G, and the plurality of blue filters 54B are disposed in a so-called stripe form.

Specifically, the red filter 54R, the green filter 54G, and the blue filter 54B form one set and a plurality of sets are disposed to form one lateral row from the −X side to the +X side along the X axis. A plurality of lateral rows are disposed along the Y axis. In each of the lateral rows, the red filter 54R, the green filter 54G, and the blue filter 54B are sequentially disposed at intervals of width x2 from one another on the X axis. That is, filters adjacent to one another on the X axis are filters of colors different from one another. In each of the lateral rows, the peripheral end on the +Y side parallel to the X axis of the red filter 54R, the peripheral end on the +Y side parallel to the X axis of the green filter 54G, and the peripheral end on the +Y side parallel to the X axis of the blue filter 54B are aligned with one another in the same position on the Y axis. In each of the lateral rows, the peripheral end on the −Y side parallel to the X axis of the red filter 54R, the peripheral end on the −Y side parallel to the X axis of the green filter 54G, and the peripheral end on the −Y side parallel to the X axis of the blue filter 54B are aligned with one another in the same position on the Y axis.

On the other hand, each of the plurality of red filters 54R, the plurality of green filters 54G, and the plurality of blue filters 54B are disposed side by side to form one longitudinal row along the Y axis and disposed to form a plurality of longitudinal rows on the X axis. In each of the longitudinal rows, any one color filters of the red filters 54R, the green filters 54G, and the blue filters 54B are disposed at intervals of width y2 from one another on the Y axis. That is, filters adjacent to one another on the Y axis are filters of the same color. The width y2 is larger than the width x2 and is, for example, 120% to 160% of the width x2.

In a row in which the plurality of red filters 54R are disposed, the peripheral ends on the −X side parallel to the Y axis of the red filters 54R adjacent to one another on the Y axis are aligned with one another in the same position on the X axis. The peripheral ends on the +X side parallel to the Y axis of the red filters 54R adjacent to one another on the Y axis are aligned with one another in the same position on the X axis. In a row in which the plurality of green filters 54G are disposed, the peripheral ends on the −X side parallel to the Y axis of the green filters 54G adjacent to one another on the Y axis are aligned with one another in the same position on the X axis. The peripheral ends on the +X side parallel to the Y axis of the green filters 54G adjacent to one another on the Y axis are aligned with one another in the same position on the X axis. In a row in which the plurality of blue filters 54B are disposed, the peripheral ends on the −X side parallel to the Y axis of the blue filters 54B adjacent to one another on the Y axis are aligned with one another in the same position on the X axis. The peripheral ends on the +X side parallel to the Y axis of the blue filters 54B adjacent to one another on the Y axis are aligned with one another in the same position.

The light blocking region 56 is provided in regions of the width x2 between the red filters 54R and the green filters 54G adjacent to each other on the X axis, between the green filters 54G and the blue filters 54B adjacent to each other on the X axis, and between the blue filters 54B and the red filters 54R adjacent to each other on the X axis. The light blocking region 56 is provided in regions of the width y2 among the red filters 54R adjacent to one another on the Y axis, among the green filters 54G adjacent to one another on the Y axis, and among the blue filters 54B adjacent to one another on the Y axis. The light blocking region 56 is also provided in any one color filters of the red filters 54R, the green filters 54G, and the blue filters 54B disposed on the outer periphery of the color filter 52 when viewed along the Z axis among the plurality of red filters 54R, the plurality of green filters 54G, and the plurality of blue filters 54B.

The plurality of microlenses 42 of the lens array 40 include first lenses 44B, second lenses 44G, and third lenses 44R. The first lenses 44B emit the white light WL2 made incident thereon toward the blue filters 54B of the color filter 52. The second lenses 44G emit the white light WL2 made incident thereon toward the green filters 54G of the color filter 52. The third lenses 44R emit the white light WL2 made incident thereon toward the red filters 54R of the color filter 52.

In the lens array 40, the third lens 44R, the second lens 44G, and the first lens 44B form one set. A plurality of sets are disposed to form one lateral row from the −X side to the +X side along the X axis. A plurality of lateral rows are disposed along the Y axis. In each of the lateral rows, the third lenses 44R, the second lenses 44G, and the first lenses 44B are adjacent to one another without intervals on the X axis. A plurality of third lenses 44R, a plurality of second lenses 44G, and a plurality of first lenses 44B are disposed side by side to form one row along the Y axis and disposed to form a plurality of rows on the X axis. In each of the rows, any one color filters of the red filters 54R, the green filters 54G, and the blue filters 54B are adjacent to one another without intervals along the Y axis.

The second lenses 44G are provided to correspond to the green filters 54G of the color filter 52. A total number of the second lenses 44G in the lens array 40 is the same as a total number of the green filters 54G in the color filter 52 and is the same as a total number of the green sub-pixel electrodes 66G included in the plurality of pixels 64 of the pixel electrode 62. When viewed along the Z axis, the second lenses 44G overlap at least the green filters 54G and are larger than the green filters 54G on the X axis and the Y axis. In the following explanation, the green filters 54G corresponding to the second lenses 44G mean the green filters 54G, at least parts of which overlap the second lenses 44G when viewed along the Z axis, among the plurality of green filters 54G of the color filter 52.

A shape of the second lens 44G when viewed along the Z axis is a rectangle. The peripheral end on the −x side parallel to the Y axis of the second lens 44G is disposed further on the −X side than the peripheral end on the −X side parallel to the Y axis of the green filter 54G corresponding to the second lens 44G. The peripheral end on the −X side parallel to the Y axis of the second lens 44G is adjacent to the corresponding green filter 54G across the light blocking region 56 on the X axis and is disposed in a region of the red filter 54R further on the −X side than the corresponding green filter 54G. The distance on the X axis between the peripheral end on the −X side parallel to the Y axis of the second lens 44G and the peripheral end on the +X side parallel to the Y axis of the red filter 54R adjacent to, on the −X side, the green filter 54G corresponding to the second lens 44G is represented as d1.

The peripheral end on the +X side parallel to the Y axis of the second lens 44G is disposed further on the +X side than the peripheral end on the +X side parallel to the Y axis of the green filter 54G corresponding to the second lens 44G. The peripheral end on the +X side parallel to the Y axis of the second lens 44G is adjacent to the corresponding green filter 54G across the light blocking region 56 on the X axis and is disposed in a region of the blue filter 54B further on the +X side than the corresponding green filter 54G. The distance on the X axis between the peripheral end on the +X side parallel to the Y axis of the second lens 44G and the peripheral end on the −X side parallel to the Y axis of the blue filter 54B adjacent to, on the +X side, the green filter 54G corresponding to the second lens 44G is d1.

The peripheral end on the +Y side parallel to the X axis of the second lens 44G is disposed further on the +Y side than the peripheral end on the +Y side parallel to the X axis of the green filter 54G corresponding to the second lens 44G. The peripheral end on the +Y side parallel to the X axis of the second lens 44G is adjacent to the corresponding green filter 54G on the Y axis and is disposed in the light blocking region 56 further on the +Y side than the corresponding green filter 54G. The distance on the Y axis between the peripheral end on the +Y side parallel to the X axis of the second lens 44G and the peripheral end on the +Y side parallel to the X axis of the green filter 54G corresponding to the second lens 44G is represented as d2.

The peripheral end on the −Y side parallel to the X axis of the second lens 44G is disposed further on the −Y side than the peripheral end on the −Y side parallel to the X axis of the green filter 54G corresponding to the second lens 44G. The peripheral end on the −Y side parallel to the X axis of the second lens 44G is adjacent to the corresponding green filter 54G on the Y axis and is disposed in the light blocking region 56 further on the −Y side than the corresponding green filter 54G. The distance on the Y axis between the peripheral end on the −Y side parallel to the X axis of the second lens 44G and the peripheral end on the −Y side parallel to the X axis of the green filter 54G corresponding to the second lens 44G is d2. The distance d2 is approximately 50% of the width y2.

Width XG on the X axis of the second lens 44G is XG=(x1)+2×(x2)+2×(d1). Width YG on the Y axis of the second lens 44G is YG=(y1)+2×(d2)=(y1)+2×(y2/2)=(y1)+(y2).

The area of an incident surface 44a and the area of an emission surface 44b of the second lens 44G are larger than the area of an incident surface 54a and the area of an emission surface 54b of the green filter 54G corresponding to the second lens 44G and are larger than the areas of the incident surfaces 54a and the areas of the emission surfaces 54b of the red filter 54R and the blue filter 54B adjacent to the corresponding green filter 54G on the X axis.

The third lenses 44R are provided to correspond to the red filters 54R of the color filter 52. A total number of the third lenses 44R in the lens array 40 is the same as a total number of the red filters 54R in the color filter 52 and is the same as a total number of the red sub-pixel electrodes 66R included in the plurality of pixels 64 of the pixel electrode 62. When viewed along the Z axis, the third lenses 44R overlap parts of the red filters 54R and overlap, for example, portions on the −X side of the red filters 54R. In the following explanation, the red filters 54R corresponding to the third lenses 44R mean the red filters 54R, at least parts of which overlap the third lenses 44R when viewed along the Z axis, among the plurality of red filters 54R of the color filter 52.

A shape of the third lens 44R when viewed along the Z axis is a rectangle. The peripheral end on the −X side parallel to the Y axis of the third lens 44R is disposed further on the −X side than the peripheral end on the −X side parallel to the Y axis of the red filter 54R corresponding to the third lens 44R. When viewed along the Z axis, the peripheral end on the −X side parallel to the Y axis of the third lens 44R is adjacent to the corresponding red filter 54R on the X axis and overlaps the light blocking region 56 disposed further on the −X side than the corresponding red filter 54R. The distance on the X axis between the peripheral end on the −X side parallel to the Y axis of the third lens 44R and the peripheral end on the −X side parallel to the Y axis of the red filter 54R corresponding to the third lens 44R is represented as d3. The distance d3 is approximately 50% of the width x2.

The peripheral end on the +X side parallel to the Y axis of the third lens 44R is disposed, on the X axis, between the peripheral end on the −X side and the peripheral end on the +X side parallel to the Y axis of the red filter 54R corresponding to the third lens 44R and overlaps the corresponding red filter 54R when viewed along the Z axis. When viewed along the Z axis, the peripheral end on the +X side parallel to the Y axis of the third lens 44R overlaps the light blocking region 56 further on the +X side than the center on the X axis of the corresponding red filter 54R. The peripheral end on the +X side parallel to the Y axis of the third lens 44R overlaps the peripheral end on the −X side parallel to the Y axis of the second lens 44G adjacent to the third lens 44R on the +X side on the X axis.

The peripheral end on the +Y side parallel to the X axis of the third lens 44R is disposed further on the +Y side than the peripheral end on the +Y side parallel to the X axis of the red filter 54R corresponding to the third lens 44R. The peripheral end on the +Y side parallel to the X axis of the third lens 44R is disposed, on the Y axis, in the same position as the peripheral end on the +Y side parallel to the X axis of the second lens 44G. The peripheral end on the −Y side parallel to the X axis of the third lens 44R is disposed further on the −Y side than the peripheral end on the −Y side parallel to the X axis of the red filter 54R corresponding to the third lens 44R. The peripheral end on the −Y side parallel to the X axis of the third lens 44R is disposed, on the Y axis, in the same position as the peripheral end on the −Y side parallel to the X axis of the second lens 44G.

Width XR on the X axis of the third lens 44R is $XR=\{(x1)-(d1)\}+(d3)=\{(x1)-(d1)\}+(x2/2)$ and is smaller than the width XG of the second lens 44G. Width YR on the Y axis of the third lens 44R is $YR=YG=(y1)+2\times(d2)=(y1)+2\times(y2/2)=(y1)+(y2)$ and is the same as the width YG of the second lens 44G.

The first lenses 44B are provided to correspond to the blue filters 54B of the color filter 52. A total number of the first lenses 44B in the lens array 40 is the same as a total number of the blue filters 54B in the color filter 52 and is the same as a total number of the blue sub-pixel electrodes 66B included in the plurality of pixels 64 of the pixel electrode 62. When viewed along the Z axis, the first lenses 44B overlap parts of the blue filters 54B and overlap, for example, portions on the −X side of the blue filters 54B. In the following explanation, the blue filters 54B corresponding to the first lenses 44B mean the blue filters 54B, parts of which overlap the first lenses 44B when viewed along the Z axis, among the plurality of blue filters 54B of the color filter 52.

A shape of the first lens 44B when viewed along the Z axis is a rectangle. The peripheral end on the −X side parallel to the Y axis of the first lens 44B is disposed, on the X axis, between the peripheral end on the −X side and the peripheral end on the +X side parallel to the Y axis of the blue filter 54B corresponding to the first lens 44B and overlap the corresponding blue filter 54B when viewed along the Z axis. When viewed along the Z axis, the peripheral end on the −X side parallel to the Y axis of the first lens 44B overlaps the light blocking region 56 further on the −X side than the center on the X axis of the blue filter 54B corresponding to the first lens 44B. The peripheral end on the −X side parallel to the Y axis of the first lens 44B overlaps the peripheral end on the +X side parallel to the Y axis of the second lens 44G adjacent to the first lens 44B on the −X side on the X axis.

The peripheral end on the +X side parallel to the Y axis of the first lens 44B is disposed further on the +X side than the peripheral end on the +X side parallel to the Y axis of the blue filter 54B corresponding to the first lens 44B. When viewed along the Z axis, the peripheral end on the +X side parallel to the Y axis of the first lens 44B is adjacent to the corresponding blue filter 54B on the X axis and overlaps the light blocking region 56 disposed further on the +X side than the corresponding blue filter 54B. The distance on the X axis between the peripheral end on the +X side parallel to the Y axis of the first lens 44B and the peripheral end on the +X side parallel to the Y axis of the blue filter 54B corresponding to the first lens 44B is d3.

The peripheral end on the +Y side parallel to the X axis of the first lens 44B is disposed further on the +Y side than the peripheral end on the +Y side parallel to the X axis of the blue filter 54B corresponding to the first lens 44B. The peripheral end on the +Y side parallel to the X axis of the first lens 44B is disposed, on the Y axis, in the same position as the peripheral end on the +Y side parallel to the X axis of the second lens 44G. The peripheral end on the −Y side parallel to the X axis of the first lens 44B is disposed further on the −Y side than the peripheral end on the −Y side parallel to the X axis of the blue filter 54B corresponding to the first lens 44B. The peripheral end on the −Y side parallel to the X axis of the first lens 44B is disposed, on the Y axis, in the same position as the peripheral end on the −Y side parallel to the X axis of the second lens 44G.

Width XB on the X axis of the first lens 44B is $XB=\{(x1)-(d1)\}+(d3)=\{(x1)-(d1)\}+(x2/2)$ and is smaller than the width XG of the second lens 44G and is the same as the width XR of the third lens 44R. Width YB on the Y axis of the first lens 44B is $YB=YG=(y1)+2\times(d2)=(y1)+2\times(y2/2)=(y1)+(y2)$ and is the same as the width YG of the second lens 44G and the width YR of the third lens 44R.

The area of the incident surface 44a and the area of the emission surface 44b of the second lens 44G are larger than the area of the incident surface 44a and the area of the emission surface 44b of the first lens 44B and the area of the incident surface 44a and the area of the emission surface 44b of the third lens 44R.

Figure 3:
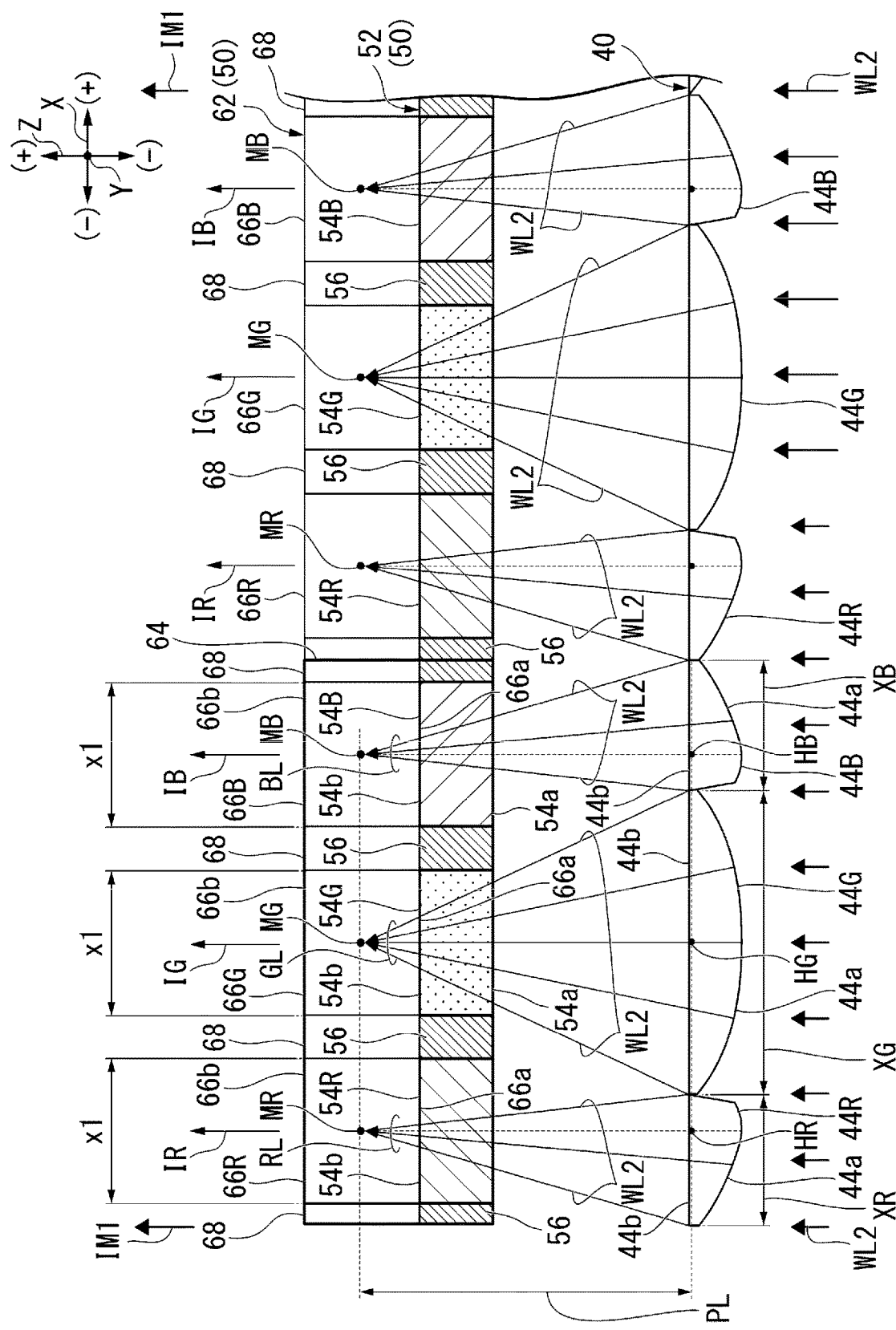
FIG. 3 is a schematic diagram of the lens array and the light modulation device of the projector shown in FIG. 1 and is a sectional view thereof in arrow view taken along a C1-C1 line shown in FIG. 2.

FIG. 3 is a schematic diagram of the lens array 40 and the color filter 52 and the pixel electrode 62 of the light modulation device 50 and is a sectional view thereof in arrow view taken along a C1-C1 line shown in FIG. 2. As shown in FIG. 3, the red sub-pixel electrodes 66R included in the plurality of pixels 64 of the pixel electrode 62 overlap the red filters 54R of the color filter 52 when viewed along the Z axis. The plurality of red sub-pixel electrodes 66R are disposed in the same positions as the positions of the plurality of red filters 54R on the XY plane. The shapes and the areas of incident surfaces 66a and emission surfaces 66b of the red sub-pixel electrodes 66R viewed along the Z axis are the same as the shapes and the areas of the incident surfaces 54a and the emission surfaces 54b of the red filters 54R.

The green sub-pixel electrodes 66G included in the plurality of pixels 64 of the pixel electrode 62 overlap the green filters 54G of the color filter 52 when viewed along the Z axis. The plurality of green sub-pixel electrodes 66G are disposed in the same positions as the positions of the plurality of green filters 54G on the XY plane. The shapes and the areas of the incident surfaces 66a and the emission surfaces 66b of the green sub-pixel electrodes 66G are the same as the shapes and the areas of the incident surfaces 54a and the emission surfaces 54b of the green filters 54G viewed along the Z axis.

The blue sub-pixel electrodes 66B included in the plurality of pixels 64 of the pixel electrode 62 overlap the blue filters 54B of the color filter 52 when viewed along the Z axis. The plurality of blue sub-pixel electrodes 66B are disposed in the same positions as the positions of the plurality of blue filters 54B on the XY plane. The shapes and the areas of the incident surfaces 66a and the emission surfaces 66b of the blue sub-pixel electrodes 66B are the same as the shapes and the areas of the incident surfaces 54a and the emission surfaces 54b of the blue filters 54B viewed along the Z axis.

In the pixel electrode 62, a wiring region 68 is provided among any one sub-pixel electrodes of the red sub-pixel electrodes 66R, the green sub-pixel electrodes 66G, and the blue sub-pixel electrodes 66B on the X axis and the Y axis. In the wiring region 68, a wire, a circuit, and the like for driving any one sub-pixel electrodes of the red sub-pixel electrodes 66R, the green sub-pixel electrodes 66G, and the blue sub-pixel electrodes 66B according to an electric signal supplied from the not-shown image output device via the circuit board or the like as explained above are formed. The wiring region 68 overlaps the light blocking region 56 of the color filter 52 when viewed along the Z axis. Therefore, the white light WL2 is not emitted to the wiring region 68.

One pixel 64 of the light modulation device 50 includes a set of the red filter 54R, the green filter 54G, and the blue filter 54B disposed side by side along the X axis in the color filter 52, the light blocking region 56 between the red filter 54R and the green filter 54G adjacent to each other on the X axis, the light blocking region 56 between the green filter 54G and the blue filter 54B, and the light blocking region 56 surrounding the set of the red filter 54R, the green filter 54G, and the blue filter 54B along the X axis and the Y axis when viewed along the Z axis. In one pixel 64, the width on the Y axis of the light blocking region 56 extending along the X axis while being in contact with the set of the red filter 54R, the green filter 54G, and the blue filter 54B from each of the +Y side and the −Y side is (y2/2). In one pixel 64, the width on the X axis of the light blocking region 56 extending along the Y axis while being in contact with the red filter 54R from the −X side is (x2/2). In one pixel 64, the width on the X axis of the light blocking region 56 extending along the Y axis while being in contact with the blue filter 54B from the +X side is (x2/2).

One pixel 64 of the light modulation device 50 includes components of the pixel electrode 62 in a region overlapping the components explained above configuring the one pixel 64 in the color filter 52. That is, the one pixel 64 includes the red sub-pixel electrode 66R, the green sub-pixel electrode 66G, and the blue sub-pixel electrode 66B corresponding to the set of the red filter 54R, the green filter 54G, and the blue filter 54B disposed along the X axis and the wiring region 68 overlapping the light blocking region 56 of the pixel 64 when viewed along the Z axis.

On the X axis, the incident surface 44a, that is, a lens surface of the second lens 44G of the lens array 40 condenses, on a condensing point MG of the green sub-pixel electrode 66G of the pixel 64, the green light GL included in the white light WL2 made incident on the incident surface 44a. The condensing point MG is set in, for example, the center on the X axis, the Y axis, and the Z axis of the green sub-pixel electrode 66G.

The white light WL2 is made incident on the second lens 44G in a range of the width XG centering on the condensing point MG on the X axis. The incident surface 44a of the second lens 44G is, for example, a curved surface convex to the −Z side with the same position as the condensing point MG set as a vertex on the X axis and is a curved surface designed according to a separation distance PL on the Z axis between a principal point HG further on the +Z side than the vertex and the condensing point MG. The principal point HG of the second lens 44G is disposed on a principal plane of the second lens 44G. The principal plane of the second lens 44G is present between the vertex of the incident surface 44a of the second lens 44G and the emission surface 44b of the second lens 44G on the Z axis and is parallel to the XY plane. The principal point HG is disposed in the same position as the center of the green sub-pixel electrode 66G corresponding to the second lens 44G on the X axis.

The separation distance PL is designed considering the width XG of the second lens 44G, the width x1 of the green filter 54G and the green sub-pixel electrode 66G, and the thickness on the Z axis of the green filter 54G and the green sub-pixel electrode 66G. The separation distance PL is appropriately designed such that a beam width on the X axis of the white light WL2 condensed by the second lens 44G and emitted to the incident surface 54a of the green filter 54G is smaller than the width x1.

Only the green light GL in the white light WL2 made incident on the green filter 54G from the incident surface 54a is transmitted through the green filter 54G, emitted from the emission surface 54b of the green filter 54G, made incident on the green sub-pixel electrode 66G from the incident surface 66a, and condensed on the condensing point MG. Since the beam width on the X axis of the white light WL2 on the incident surface 54a of the green filter 54G is smaller than the width x1 as explained above, a loss of the white light WL2 made incident on the green filter 54G and a loss of the green light GL condensed on the green sub-pixel electrode 66G are reduced.

When viewed along the Z axis, the vertex of the incident surface 44a of the second lens 44G and the condensing point MG of the green sub-pixel electrode 66G are disposed in the center on the X axis of the width XG of the second lens 44G. Therefore, the second lens 44G does not have eccentricity on the X axis. The emission surface 44b of the second lens 44G is a flat surface disposed further on the +Z side than the incident surface 44a of the second lens 44G and parallel to the XY plane.

On the X axis, the incident surface 44a, that is, a lens surface of the third lens 44R of the lens array 40 condenses, on a condensing point MR of the red sub-pixel electrode 66R of the pixel 64, red light RL included in the white light WL2 made incident on the incident surface 44a. The condensing point MR is set in the center on the X axis, the Y axis, and the Z axis of the red sub-pixel electrode 66R.

The white light WL2 is made incident on the third lens 44R in a range of the width XR on the X axis. The condensing point MR of the red sub-pixel electrode 66R is disposed further on the +X side than the center on the X axis of the width XR of the third lens 44R. The incident surface 44a of the third lens 44R is, for example, a curved surface convex to the −Z side with the same position as the condensing point MR set as a vertex on the X axis and is a curved surface designed according to a center wavelength of the red light RL and the separation distance PL on the Z axis between a principal point HR further on the +Z side than the vertex and the condensing point MR. The incident surface 44a of the third lens 44R is designed considering the width XR of the third lens 44R, the width x1 of the red filter 54R and the red sub-pixel electrode 66R, the thickness on the Z axis of the red filter 54R and the red sub-pixel electrode 66R, and the separation distance PL. The principal point HR of the third lens 44R is disposed on a principal plane of the third lens 44R. The principal plane of the third lens 44R is present between the vertex of the incident surface 44a of the third lens 44R and the emission surface 44b of the third lens 44R on the Z axis and is parallel to the XY plane. The principal point HR is disposed in the same position as the center of the red sub-pixel electrode 66R corresponding to the third lens 44R on the X axis.

A beam width on the X axis of the white light WL2 condensed by the third lens 44R and emitted to the incident surface 54a of the red filter 54R is smaller than the width x1. Only the red light RL in the white light WL2 made incident on the red filter 54R from the incident surface 54a is transmitted through the red filter 54R, emitted from the emission surface 54b of the red filter 54R, made incident on the red sub-pixel electrode 66R from the incident surface 66a, and condensed on the condensing point MR. Since the beam width on the X axis of the white light WL2 on the incident surface 54a of the red filter 54R is smaller than the width x1 as explained above, a loss of the white light WL2 made incident on the red filter 54R and a loss of the red light RL condensed on the red sub-pixel electrode 66R are reduced.

When viewed along the Z axis, the vertex of the incident surface 44a of the third lens 44R and the condensing point MR of the red sub-pixel electrode 66R deviate to the +X side from the center on the X axis of the width XR of the third lens 44R. Therefore, the third lens 44R has eccentricity on the X axis. The emission surface 44b of the third lens 44R is a flat surface disposed further on the +Z side than the incident surface 44a of the third lens 44R and parallel to the XY plane.

On the X axis, the incident surface 44a, that is, a lens surface of the first lens 44B of the lens array 40 condenses, on a condensing point MB of the blue sub-pixel electrode 66B of the pixel 64, the blue light BL included in the white light WL2 made incident on the incident surface 44a. The condensing point MB is set in, for example, the center on the X axis, the Y axis, and the Z axis of the blue sub-pixel electrode 66B.

The white light WL2 is made incident on the first lens 44B in a range of the width XB on the X axis. The condensing point MB of the blue sub-pixel electrode 66B is disposed further on the −X side than the center on the X axis of the width XB of the first lens 44B. The incident surface 44a of the first lens 44B is, for example, a curved surface convex to the −Z side with the same position as the condensing point MB set as a vertex on the X axis and is a curved surface designed according to a center wavelength of the blue light BL and the separation distance PL on the Z axis between a principal point HB further on the +Z side than the vertex and the condensing point MB. The incident surface 44a of the first lens 44B is designed considering the width XB of the first lens 44B, the width x1 of the blue filter 54B and the blue sub-pixel electrode 66B, the thickness on the Z axis of the blue filter 54B and the blue sub-pixel electrode 66B, and the separation distance PL. The principal point HB of the first lens 44B is disposed on a principal plane of the first lens 44B. The principal plane of the first lens 44B is present between the vertex of the incident surface 44a of the first lens 44B and the emission surface 44b of the first lens 44B on the Z axis and is parallel to the XY plane. The principal point HB is disposed in the same position as the center of the blue sub-pixel electrode 66B corresponding to the first lens 44B on the X axis.

A beam width on the X axis of the white light WL2 condensed by the first lens 44B and emitted to the incident surface 54a of the blue filter 54B is smaller than the width x1. Only the blue light BL in the white light WL2 made incident on the blue filter 54B from the incident surface 54a is transmitted through the blue filter 54B, emitted from the emission surface 54b of the blue filter 54B, made incident on the blue sub-pixel electrode 66B from the incident surface 66a, and condensed on the condensing point MB. Since the beam width on the X axis of the white light WL2 on the incident surface 54a of the blue filter 54B is smaller than the width x1 as explained above, a loss of the white light WL2 made incident on the blue filter 54B and a loss of the blue light BL condensed on the blue sub-pixel electrode 66B are reduced.

Note that the transmittance of the green light GL in the green filter 54G is higher than at least the transmittance of the red light RL in the red filter 54R and the transmittance of the blue light BL in the blue filter 54B and is equal to the transmittance of the red light RL in the red filter 54R and the transmittance of the blue light BL in the blue filter 54B.

Figure 4:
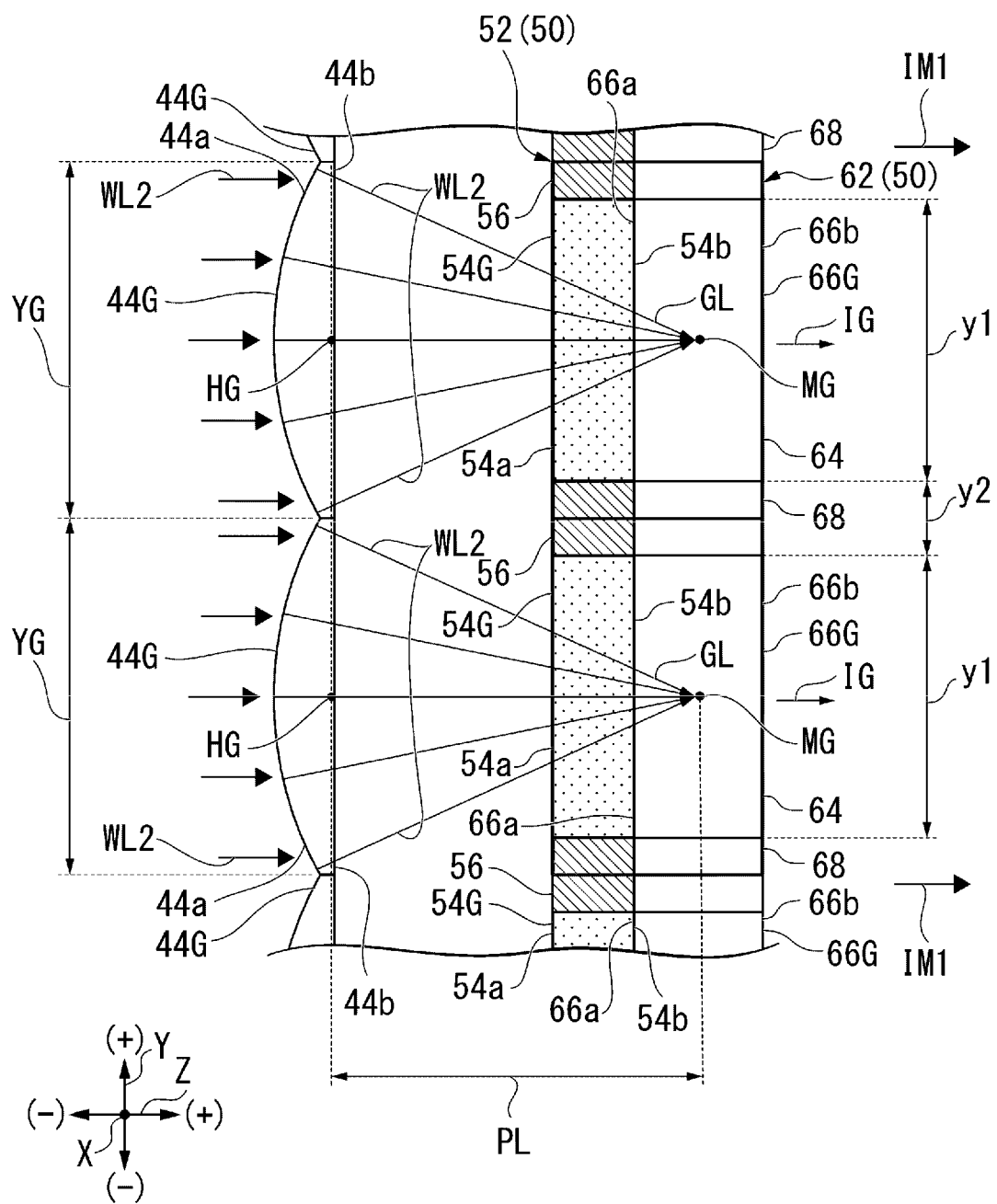
FIG. 4 is a schematic diagram of the lens array and the light modulation device of the projector shown in FIG. 1 and is a sectional view thereof in arrow view taken along a C2-C2 line shown in FIG. 2.

FIG. 4 is a schematic diagram of the lens array 40 and the color filter 52 and the pixel electrode 62 of the light modulation device 50 and is a sectional view thereof in arrow view taken along a C2-C2 line shown in FIG. 2. As shown in FIG. 4, the incident surface 44a of the second lens 44G is, for example, a curved surface convex to the −Z side with the same position as the condensing point MG set as a vertex on the Y axis and is a curved surface set according to a center wavelength of the green light GL and the separation distance PL. The principal point HG of the second lens 44G is disposed in the same position as the center of the green sub-pixel electrode 66G corresponding to the second lens 44G on the Y axis.

A beam width on the Y axis of the white light WL2 condensed by the second lens 44G and emitted to the incident surface 54a of the green filter 54G is smaller than the width y1. Only the green light GL in the white light WL2 made incident on the green filter 54G from the incident surface 54a is transmitted through the green filter 54G, emitted from the emission surface 54b of the green filter 54G, made incident on the green sub-pixel electrode 66G from the incident surface 66a, and condensed on the condensing point MG. Since the beam width on the Y axis of the white light WL2 on the incident surface 54a of the green filter 54G is smaller than the width y1 as explained above, a loss of the white light WL2 made incident on the green filter 54G and a loss of the blue light BL condensed on the green sub-pixel electrode 66G are reduced.

When viewed along the Z axis, the vertex of the incident surface 44a of the second lens 44G and the condensing point MG of the green sub-pixel electrode 66G are disposed in the center on the Y axis of the width YG of the second lens 44G. Therefore, the second lens 44G does not have eccentricity on the Y axis as well.

Although not shown, on the Y axis, the incident surface 44a of the third lens 44R is, for example, a curved surface convex to the −Z side with the same position as the condensing point MR set as a vertex and is a curved surface set according to a center wavelength of the red light RL and the separation distance PL. The principal point HR of the third lens 44R is disposed in the same position as the center of the red sub-pixel electrode 66R corresponding to the third lens 44R on the Y axis. On the Y axis as well, only the red light RL in the white light WL2 made incident on the red filter 54R from the incident surface 54a is transmitted through the red filter 54R, made incident on the red sub-pixel electrode 66R, and condensed on the condensing point MR.

A beam width on the Y axis of the white light WL2 condensed by the third lens 44R and emitted to the incident surface 54a of the red filter 54R is smaller than the width y1. On the Y axis as well, a loss of the white light WL2 made incident on the red filter 54R and a loss of the red light RL condensed on the red sub-pixel electrode 66R are reduced.

When viewed along the Z axis, the vertex of the incident surface 44a of the third lens 44R and the condensing point MR of the red sub-pixel electrode 66R are disposed in the center on the Y axis of the width YR of the third lens 44R. Therefore, the third lens 44R does not have eccentricity on the Y axis.

On the Y axis, the incident surface 44a of the first lens 44B is, for example, a curved surface convex to the −Z side with the same position as the condensing point MB set as a vertex and is a curved surface designed according to a center wavelength of the blue light BL and the separation distance PL. The principal point HB of the first lens 44B is disposed in the same position as the center of the blue sub-pixel electrode 66B corresponding to the first lens 44B on the Y axis. On the Y axis as well, only the blue light BL in the white light WL2 made incident on the blue filter 54B from the incident surface 54a is transmitted through the blue filter 54B, made incident on the blue sub-pixel electrode 66B, and condensed on the condensing point MR.

A beam width on the Y axis of the white light WL2 condensed by the first lens 44B and emitted to the incident surface 54a of the blue filter 54B is smaller than the width y1. On the Y axis as well, a loss of the white light WL2 made incident on the red filter 54R and a loss of the red light RL condensed on the red sub-pixel electrode 66R are reduced.

When viewed along the Z axis, the vertex of the incident surface 44a of the first lens 44B and the condensing point MB of the blue sub-pixel electrode 66B are disposed in the center on the Y axis of the width YB of the first lens 44B. Therefore, the first lens 44B does not have eccentricity on the Y axis.

Figure 5:
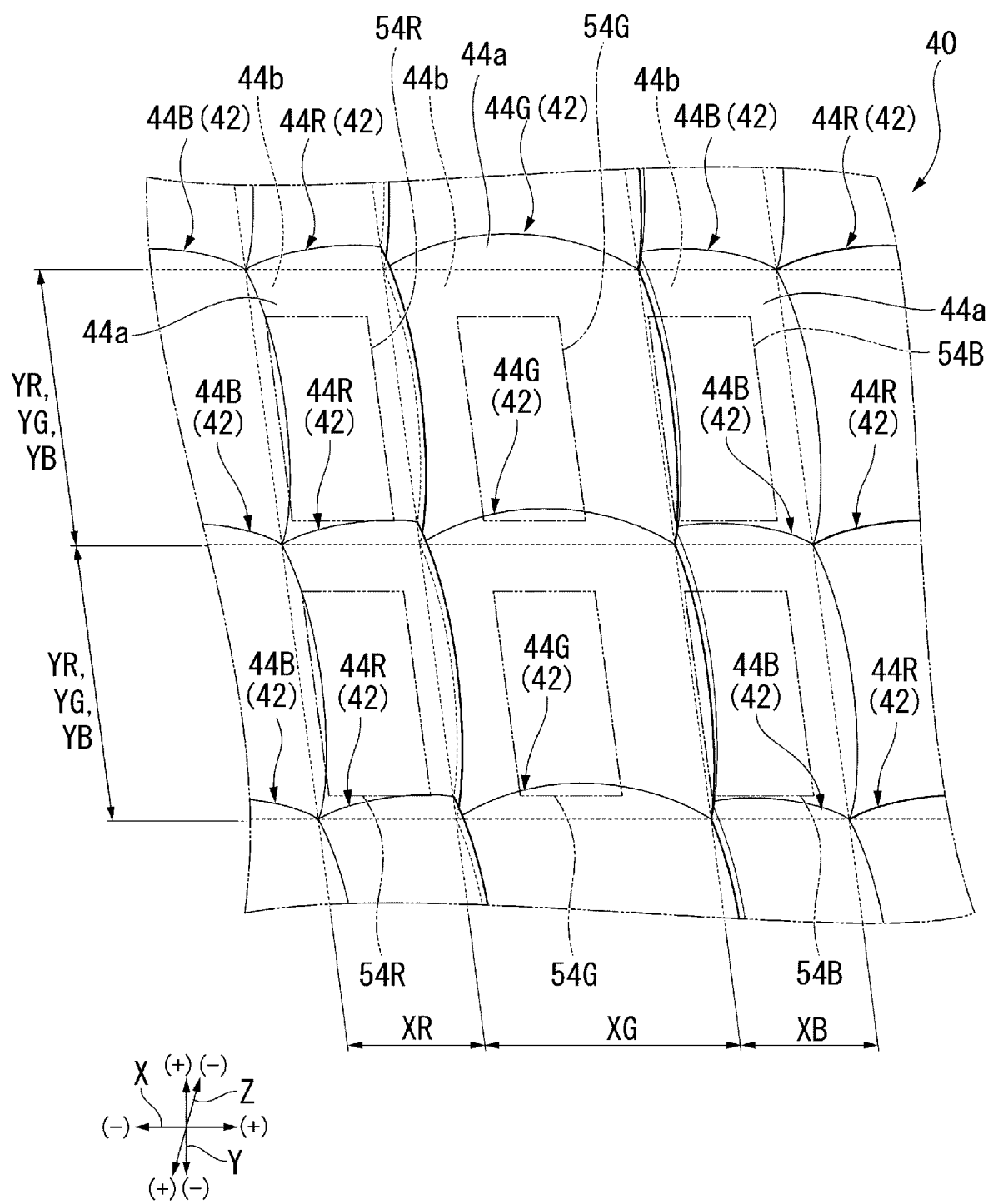
FIG. 5 is a perspective view of the lens array of the projector shown in FIG. 1.

FIG. 5 is a perspective view of the lens array 40. In FIG. 5, the red filters 54R, the green filters 54G, and the blue filters 54B of the color filter 52 are indicated by alternate long and two short dashes lines. A component parallel to the X axis on the incident surface 44a of the second lens 44G of the lens array 40 is designed with the width XG set as an effective aperture and with the separation distance PL on the Z axis between the principal point HG of the second lens 44G and the condensing point MG of the green sub-pixel electrode 66G, which are not shown in FIG. 5, set as a focal length. A component parallel to the Y axis on the incident surface 44a of the second lens 44G is designed with the width YG larger than the width XG set as an effective aperture and with the separation distance PL on the Z axis between the principal point HG and the condensing point MG set as a focal length. Therefore, a numerical aperture (NA) of the incident surface 44a of the second lens 44G in sectional view along the Y axis is larger than a numerical aperture of the incident surface 44a of the second lens 44G in sectional view along the X axis.

A component parallel to the X axis on the incident surface 44a of the third lens 44R of the lens array 40 is designed with the width XR smaller than the width XG of the second lens 44G set as an effective aperture and with the separation distance PL on the Z axis between the principal point HR of the third lens 44R and the condensing point MR of the red sub-pixel electrode 66R, which are not shown in FIG. 5, set as a focal length. A component parallel to the Y axis on the incident surface 44a of the third lens 44R is designed with the width YR larger than the width XR set as an effective aperture and with the separation distance PL on the Z axis between the principal point HR and the condensing point MR set as a focal length. Therefore, a numerical aperture of the incident surface 44a of the third lens 44R in sectional view along the X axis is smaller than a numerical aperture of the incident surface 44a of the second lens 44G in sectional view along the X axis. A numerical aperture of the incident surface 44a of the third lens 44R in sectional view along the Y axis is larger than a numerical aperture of the incident surface 44a of the third lens 44R in sectional view along the X axis and is equal to a numerical aperture of the incident surface 44a of the second lens 44G in sectional view along the Y axis.

A component parallel to the X axis on the incident surface 44a of the first lens 44B of the lens array 40 is designed with the width XB smaller than the width XG of the second lens 44G set as an effective aperture and with the separation distance PL on the Z axis between the principal point HB of the first lens 44B and the condensing point MR of the blue sub-pixel electrode 66B, which are not shown in FIG. 5, set as a focal length. A component parallel to the Y axis on the incident surface 44a of the first lens 44B is designed with the width YB larger than the width XB set as an effective aperture and with the separation distance PL on the Z axis between the principal point HB and the condensing point MB set as a focal length. Therefore, a numerical aperture of the incident surface 44a of the first lens 44B in sectional view along the X axis is smaller than a numerical aperture of the incident surface 44a of the second lens 44G in sectional view along the X axis. A numerical aperture of the incident surface 44a of the first lens 44B in sectional view along the Y axis is larger than a numerical aperture of the incident surface 44a of the first lens 44B in sectional view along the X axis and is equal to a numerical aperture of the incident surface 44a of the second lens 44G in sectional view along the Y axis.

The white light WL2 made incident on the lens array 40 is collimated by the collimating lens 25. On the XY plane, a light amount of the white light WL2 per unit area is set substantially equal. The width XG of the second lens 44G of the lens array 40 is larger than the width XB of the first lens 44B and the width XR of the third lens 44R. The width YG of the second lens 44G is equal to the width YB of the first lens 44B and the width YR of the third lens 44R. Therefore, a light amount of the white light WL2 taken into the second lens 44G is larger than a light amount of the white light WL2 taken into each of the first lens 44B and the third lens 44R. A light amount difference between the light amount of the white light WL2 taken into the second lens 44G and the light amount of the white light WL2 taken into each of the first lens 44B and the third lens 44R depends on the difference between the area on the XY plane of the second lens 44G and the area on the XY plane of each of the first lens 44B and the third lens 44R. In the configuration explained above, the light amount difference between the light amount of the white light WL2 taken into the second lens 44G and the light amount of the white light WL2 taken into each of the first lens 44B and the third lens 44R depends on (XG-XB) and (XG-XR).

A light amount of the green light GL included in the white light WL2 is equal to or larger than a light amount of the red light RL and a light amount of the blue light BL included in the white light WL2. Therefore, a light amount of the green light GL taken into the second lens 44G and condensed on the green sub-pixel electrode 66G is larger than a light amount of the red light RL taken into the third lens 44R and condensed on the red sub-pixel electrode 66R and a light amount of the blue light BL taken into the first lens 44B and condensed on the blue sub-pixel electrode 66B. Therefore, in one pixel 64, a light amount of the green light GL made incident on the green sub-pixel electrode 66G is larger than a light amount of the red light RL made incident on the red sub-pixel electrode 66R and a light amount of the blue light BL made incident on the blue sub-pixel electrode 66B.

As shown in FIGS. 3 and 4, the green light GL made incident on the green sub-pixel electrode 66G of the pixel electrode 62 is modulated into green image light IG by the switching element as explained above. The green image light IG has intensity and a light amount corresponding to an electric signal concerning the green light GL supplied to the switching element and is emitted to the +Z side along the Z axis from the emission surface 66b of the green sub-pixel electrode 66G. Similarly, the red light RL made incident on the red sub-pixel electrode 66R is modulated into red image light IR by the switching element. The red image light IR has intensity and a light amount corresponding to an electric signal concerning the red light RL supplied to the switching element and is emitted to the +Z side along the Z axis from the emission surface 66b of the red sub-pixel electrode 66R. The blue light BL made incident on the blue sub-pixel electrode 66B is modulated into blue image light IB by the switching element. The blue image light IB has intensity and a light amount corresponding to an electric signal concerning the blue light BL supplied to the switching element and is emitted to the +Z side along the Z axis from the emission surface 66b of the blue sub-pixel electrode 66B.

As shown in FIG. 3, the image lights IR, IG, and IB emitted from the emission surfaces 66b of the red sub-pixel electrode 66R, the green sub-pixel electrode 66G, and the blue sub-pixel electrode 66B, that is, the emission surface 62b of the pixel electrode 62 are combined with one another to form the full-color image light IM1. When the intensity of the electric signal at the time when the red light RL is modulated by the red sub-pixel electrode 66R, the intensity of the electric signal at the time when the green light GL is modulated by the green sub-pixel electrode 66G, and the intensity of the electric signal at the time when the blue light BL is modulated by the blue sub-pixel electrode 66B are equal to one another, the light amount of the green image light IG included in the image light IM1 is larger than the light amounts of the red image light IR and the blue image light IB included in the image light IM1.

The image light IM1 passes through the emission-side polarizing plate 80 and the condensing lens 85 as explained above and is enlarged and projected toward the not-shown screen by the projection optical system 90 as the image light IM2 and is displayed on a display surface facing the projection optical system 90 on the optical axis AX on the screen. Since a color balance in the image light IM2 is retained in an image and a video displayed on the screen, a green light amount is relatively larger than red and blue light amounts. An observer can observe, according to visibility, the image and the video having the larger green light amount and visually recognize the image and the video that are bright as a whole.

Subsequently, results of performing numerical value calculation for brightness and white balance of the image light IM1 with respect to the transmittance of the red light RL transmitted through the red filter 54R of the color filter 52, the transmittance of the green light GL transmitted through the green filter 54G of the color filter 52, and the transmittance of the blue light BL transmitted through the blue filter 54B of the color filter 52 are explained.

In Table 1, numerical value calculation results of a numerical value calculation pattern [1] to a numerical value calculation pattern [7] are shown. In the numerical value calculation pattern [1] to the numerical value calculation pattern [7], a peak wavelength of the red light RL was set as 610 nm, a peak wavelength of the green light GL was set as 550 nm, and a peak wavelength of the blue light BL was set as 450 nm.

TABLE 1

| Pattern | Red F [%] | Green F [%] | Blue F [%] | Brightness [%] | Color temperature [K] | Deviation |
|---------|-----------|-------------|------------|----------------|-----------------------|-----------|
| [1]     | 100       | 100         | 100        | 100            | 8831                  | −0.014    |
| [2]     | 90        | 106         | 100        | 102            | 9053                  | −0.009    |
| [3]     | 100       | 111         | 90         | 107            | 7372                  | −0.006    |
| [4]     | 117       | 90          | 100        | 96             | 8407                  | −0.024    |
| [5]     | 100       | 90          | 109        | 94             | 11463                 | −0.022    |
| [6]     | 90        | 117         | 90         | 109            | 7595                  | −0.001    |
| [7]     | 100       | 110         | 100        | 103            | 8288                  | −0.009    |

The numerical value calculation pattern [1] is a pattern serving as a reference of this numerical value calculation example. In the numerical value calculation pattern [1], it was assumed that the transmittance of the red light RL in the red filter 54R, the transmittance of the green light GL in the green filter 54G, and the transmittance of the blue light BL in the blue filter 54B were equal to one another.

Reference examples in which the transmittances of the color filters in the numerical value calculation pattern [1] are realized include a case in which, in the configuration of this embodiment explained above, the shape and the area of each of the first lens 44B, the second lens 44G, and the third lens 44R of the lens array 40 viewed along the Z axis are equal to the shape and the area of the blue sub-pixel electrode 66B, the green sub-pixel electrode 66G, or the red sub-pixel electrode 66R corresponding to each of the lenses in the pixel electrode 62. In this case, when viewed along the Z axis, the respective lenses overlap the blue sub-pixel electrode 66B, the green sub-pixel electrode 66G, and the red sub-pixel electrode 66R corresponding thereto. The lenses do not have eccentricity on the X axis and the Y axis.

In the numerical value calculation pattern [1], a color temperature of the image light IM1 at the time when color lights respectively transmitted through the red filter 54R, the green filter 54G, and the blue filter 54B were combined was calculated as 8831 [K] and a color deviation of the image light IM1 was calculated as −0.014.

Numerical values in fields of "red F", "green F", and "blue F" of Table 1 represent transmittances of color lights in the red filter 54R, the green filter 54G, and the blue filter 54B in the numerical value calculation patterns at the time when the transmittances of the color lights in the red filter 54R, the green filter 54G, and the blue filter 54B assumed in the numerical value calculation pattern [1] were set to 100%. Numerical values in a field of "brightness" of Table 1 represent the brightness of the image light IM1 in the numerical value calculation patterns at the time when the brightness of the image light IM1 in the numerical value calculation pattern [1] was set to 100%. Note that, for all the numerical value calculation patterns, the brightness of the image light IM1 was represented by a unit of lumen [lm] and converted into a ratio to the brightness of the numerical value calculation pattern [1] as explained above. "Color temperature" and "color deviation" were used as evaluation values for white balance of the image light IM1 in the numerical value calculation patterns of Table 1. Numerical values in fields of "deviation" of Table 1 represent the color deviation explained above.

In the numerical value calculation pattern [2], the transmittance of the red light RL in the red filter 54R was reduced to 90%, the transmittance of the green light GL in the green filter 54G was increased to 106%, and the transmittance of the blue light BL in the blue filter 54B was maintained at 100% with respect to the assumption of the numerical value calculation pattern [1]. In order to realize the transmittances of the color filters in the numerical value calculation pattern [2], for example, a peripheral end facing the third lens 44R on the X axis in the second lens 44G can be moved to be closer to the third lens 44R from the configuration of the reference example of the numerical value calculation pattern [1]. A peripheral end facing the second lens 44G in the third lens 44R can be moved to be closer to the peripheral end on the opposite side on the X axis from the configuration of the reference example of the numerical value calculation pattern [1]. Consequently, the light amount of the white light WL2 taken into the second lens 44G becomes larger than the light amount of the white light WL2 taken into the second lens 44G.

The brightness of the image light IM1 in the numerical value calculation pattern [2] increased 2% with respect to the numerical value calculation pattern [1]. This result is considered to have been obtained because the light amount of the green image light IG with respect to the blue image light IB and the red image light IR increased in the numerical value calculation pattern [2] to be larger than the light amount in the numerical value calculation pattern [1] and visibility at the time of observation was improved. In the numerical value calculation pattern [2], compared with the numerical value calculation pattern [1], a light amount difference of the green image light IG with respect to the red image light IR is larger than a light amount difference of the green image light IG with respect to the blue image light IB. Therefore, a spectrum of the image light IM1 in the numerical value calculation pattern [2] slightly deviates from the human visibility.

A color temperature of the image light IM1 in the numerical value calculation pattern [2] was calculated as 9053 [K] and a color deviation of the image light IM1 in the numerical value calculation pattern [2] was calculated as −0.009. The color temperature of the image light IM1 in the numerical value calculation pattern [2] is considered to have become higher than the color temperature in the numerical value calculation pattern [1]. The image light IM1 in the numerical value calculation pattern [2] is considered to have become more bluish compared with the image light IM1 in the numerical value calculation pattern [1]. As explained above, the color deviation of the image light IM1 in the numerical value calculation pattern [2] is considered to have been reduced be smaller than the color deviation in the numerical value calculation pattern [1] because the spectrum of the image light IM1 in the numerical value calculation pattern [2] came closer to the human visibility.

In the numerical value calculation pattern [3], the transmittance of the red light RL in the red filter 54R was maintained at 100%, the transmittance of the green light GL in the green filter 54G was increased to 111%, and the transmittance of the blue light BL in the blue filter 54B was reduced to 90% with respect to the assumption of the numerical value calculation pattern [1]. In order to realize the transmittances of the color filters in the numerical value calculation pattern [3], for example, a peripheral end facing the first lens 44B on the X axis in the second lens 44G can be moved to be closer to the first lens 44B from the configuration of the reference example of the numerical value calculation pattern [1]. A peripheral end facing the second lens 44G in the first lens 44B can be moved to be closer to the peripheral end on the opposite side on the X axis from the configuration of the reference example of the numerical value calculation pattern [1]. Consequently, the light amount of the white light WL2 taken into the second lens 44G becomes larger than the light amount of the white light WL2 taken into the third lens 44R.

The brightness of the image light IM1 in the numerical value calculation pattern [3] increased 7% with respect to the numerical value calculation pattern [1]. This result is considered to have been obtained because the light amount of the green image light IG with respect to the blue image light IB and the red image light IR increased in the numerical value calculation pattern [3] as well to be larger than the light amount in the numerical value calculation pattern [1] and the visibility at the time of observation was improved. In the numerical value calculation pattern [3], compared with the numerical value calculation pattern [1], a light amount difference of the green image light IG with respect to the red image light IR is smaller than a light amount difference of the green image light IG with respect to the blue image light IB. Therefore, a spectrum of the image light IM1 in the numerical value calculation pattern [3] slightly deviates from the human visibility and is different from the spectrum of the image light IM1 in the numerical value calculation pattern [2] as well.

A color temperature of the image light IM1 in the numerical value calculation pattern [3] was calculated as 7372 [K] and a color deviation of the image light IM1 in the numerical value calculation pattern [3] was calculated as −0.006. The color temperature of the image light IM1 in the numerical value calculation pattern [3] is considered to have become lower than the color temperature in the numerical value calculation pattern [1]. The image light IM1 in the numerical value calculation pattern [3] is considered to have become more reddish compared with the image light IM1 in the numerical value calculation pattern [1]. As explained above, the color deviation of the image light IM1 in the numerical value calculation pattern [3] is considered to have been reduced to be smaller than the color deviation in the numerical value calculation pattern [1] because the spectrum of the image light IM1 in the numerical value calculation pattern [3] came closer to the human visibility. The color deviation of the image light IM1 in the numerical value calculation pattern [3] is considered to have been reduced to be smaller than the color deviation in the numerical value calculation pattern [2] because the image light IM1 in the numerical value calculation pattern [3] became less bluish and came closer to white.

In the numerical value calculation pattern [4], the transmittance of the red light RL in the red filter 54R was increased to 117%, the transmittance of the green light GL in the green filter 54G was reduced to 90%, and the transmittance of the blue light BL in the blue filter 54B was maintained at 100% with respect to the assumption of the numerical value calculation pattern [1]. In order to realize the transmittances of the color filters in the numerical value calculation pattern [4], for example, a peripheral end facing the second lens 44G on the X axis in the third lens 44R can be moved to be closer to the second lens 44G from the configuration of the reference example of the numerical value calculation pattern [1]. A peripheral end facing the third lens 44R in the second lens 44G can be moved to be closer to the peripheral end on the opposite side on the X axis from the configuration of the reference example of the numerical value calculation pattern [1]. Consequently, the light amount of the white light WL2 taken into the third lens 44R becomes larger than the light amount of the white light WL2 taken into the second lens 44G.

The brightness of the image light IM1 in the numerical value calculation pattern [4] decreased 4% with respect to the numerical value calculation pattern [1]. This result is considered to have been obtained because the light amount of the green image light IG with respect to the blue image light IB and the red image light IR was reduced in the numerical value calculation pattern [4] to be smaller than the light amount in the numerical value calculation pattern [1] and the visibility at the time of observation decreased. In the numerical value calculation pattern [4], compared with the numerical value calculation pattern [1], a light amount difference of the green image light IG with respect to the red image light IR is larger than a light amount difference of the green image light IG with respect to the blue image light IB. Therefore, a spectrum of the image light IM1 in the numerical value calculation pattern [4] deviates from the human visibility.

A color temperature of the image light IM1 in the numerical value calculation pattern [4] was calculated as 8047 [K] and a color deviation of the image light IM1 in the numerical value calculation pattern [4] was calculated as −0.024. The color temperature of the image light IM1 in the numerical value calculation pattern [4] is considered to have become lower than the color temperature in the numerical value calculation pattern [1]. The image light IM1 in the numerical value calculation pattern [4] is considered to have become slightly more reddish compared with the image light IM1 in the numerical value calculation pattern [1]. As explained above, the color deviation of the image light IM1 in the numerical value calculation pattern [4] is considered to have increased to be larger than the color deviation in the numerical value calculation pattern [1] because a relative light amount of the green image light IG included in the image light IM1 decreased and the spectrum of the image light IM1 in the numerical value calculation pattern [4] moved away from the human visibility.

In the numerical value calculation pattern [5], the transmittance of the red light RL in the red filter 54R was maintained at 100%, the transmittance of the green light GL in the green filter 54G was reduced to 90%, and the transmittance of the blue light BL in the blue filter 54B was increased to 109% with respect to the assumption of the numerical value calculation pattern [1]. In order to realize the transmittances of the color filters in the numerical value calculation pattern [5], for example, a peripheral end facing the second lens 44G on the X axis in the first lens 44B can be moved to be closer to the second lens 44G from the configuration of the reference example of the numerical value calculation pattern [1]. A peripheral end facing the first lens 44B in the second lens 44G can be moved to be closer to the peripheral end on the opposite side on the X axis from the configuration of the reference example of the numerical value calculation pattern [1]. Consequently, the light amount of the white light WL2 taken into the first lens 44B becomes larger than the light amount of the white light WL2 taken into the second lens 44G.

The brightness of the image light IM1 in the numerical value calculation pattern [5] decreased 6% with respect to the numerical value calculation pattern [1]. This result is considered to have been obtained because the light amount of the green image light IG with respect to the blue image light IB and the red image light IR was reduced in the numerical value calculation pattern [5] to be smaller than the light amount in the numerical value calculation pattern [1] and the visibility at the time of observation decreased. In the numerical value calculation pattern [5], compared with the numerical value calculation pattern [1], a light amount difference of the green image light IG with respect to the red image light IR is smaller than a light amount difference of the green image light IG with respect to the blue image light IB. Therefore, a spectrum of the image light IM1 in the numerical value calculation pattern [5] deviates from the human visibility and is different from the spectrum of the image light IM1 in the numerical value calculation pattern [4] as well.

A color temperature of the image light IM1 in the numerical value calculation pattern [5] was calculated as 11463 [K] and a color deviation of the image light IM1 in the numerical value calculation pattern [5] was calculated as −0.022. The color temperature of the image light IM1 in the numerical value calculation pattern [5] is considered to have become extremely higher than the color temperature in the numerical value calculation pattern [1]. The image light IM1 in the numerical value calculation pattern [5] is considered to have become more bluish compared with the image light IM1 in the numerical value calculation pattern [1]. As explained above, the color deviation of the image light IM1 in the numerical value calculation pattern [5] is considered to have increased to be larger than the color deviation in the numerical value calculation pattern [1] and reached the same degree as the color deviation in the numerical value calculation pattern [4] because the relative light amount of the green image light IG included in the image light IM1 decreased and the spectrum of the image light IM1 in the numerical value calculation pattern [5] moved away from the human visibility.

In the numerical value calculation pattern [6], the transmittance of the red light RL in the red filter 54R was reduced to 90%, the transmittance of the green light GL in the green filter 54G was maintained at 100%, and the transmittance of the blue light BL in the blue filter 54B was reduced to 90% with respect to the assumption of the numerical value calculation pattern [1]. A relative relation among the transmittances of the color lights in the color filters in the numerical value calculation pattern [6] is the same as the relative relation among the transmittances of the color lights in the color filters realized by the pixel electrode 62 of the projector 301 in this embodiment explained above. In order to realize the transmittances of the color filters in the numerical value calculation pattern [6], for example, a peripheral end facing each of the first lens 44B and the third lens 44R on the X axis in the second lens 44G can be moved to be closer to each of the first lens 44B and the third lens 44R from the configuration of the reference example of the numerical value calculation pattern [1]. A peripheral end facing the second lens 44G on the X axis in each of the first lens 44B and the third lens 44R can be moved to be closer to the peripheral end on the opposite side and away from the second lens 44G from the configuration of the reference example of the numerical value calculation pattern [1]. Consequently, the light amount of the white light WL2 taken into the second lens 44G becomes larger than the light amount of the white light WL2 taken into the first lens 44B and the third lens 44R.

The brightness of the image light IM1 in the numerical value calculation pattern [6] increased 9% with respect to the numerical value calculation pattern [1]. This result is considered to have been obtained because, in the numerical value calculation pattern [6], the light amount of the green image light IG with respect to each of the blue image light IB and the red image light IR was higher than the light amount in the numerical value calculation pattern [1] and the visibility at the time of observation satisfactorily increased. In the numerical value calculation pattern [6], compared with the numerical value calculation pattern [1], a light amount difference of the green image light IG with respect to the blue image light IB and a light amount difference of the green image light IG with respect to the red image light IR are equal. Therefore, a spectrum of the image light IM1 in the numerical value calculation pattern [6] is the closest to the human visibility among the numerical value calculation patterns [1] to [6] and the numerical value calculation pattern [7] explained below.

A color temperature of the image light IM1 in the numerical value calculation pattern [6] was calculated as 7595 [K] and a color deviation of the image light IM1 in the numerical value calculation pattern [6] was calculated as −0.001. The color temperature of the image light IM1 in the numerical value calculation pattern [6] is considered to have become lower than the color temperature in the numerical value calculation pattern [1]. The image light IM1 in the numerical value calculation pattern [6] is considered to have become intensely more bluish compared with the image light IM1 in the numerical value calculation pattern [1]. As explained above, the color deviation of the image light IM1 in the numerical value calculation pattern [6] decreased to be smaller than the color deviation at least in the numerical value calculation pattern [1] and was the smallest among the numerical value calculation patterns [1] to [7] because the relative light amount of the green image light IG included in the image light IM1 increased and the spectrum of the image light IM1 in the numerical value calculation pattern [6] came closer to the human visibility than in the numerical value calculation pattern [1].

In the numerical value calculation pattern [7], the transmittance of the red light RL in the red filter 54R was maintained at 100%, the transmittance of the green light GL in the green filter 54G was increased to 110%, and the transmittance of the blue light BL in the blue filter 54B was maintained at 100% with respect to the assumption of the numerical value calculation pattern [1]. In order to realize the transmittances of the color filters in the numerical value calculation pattern [7], for example, at least one of the peripheral end on the +Y side and the peripheral end on the −Y side parallel to the X axis in the second lens 44G can be moved in the outward direction of the second lens 44G when viewed along the Z axis from the configuration of the reference example of the numerical value calculation pattern [1] and increase a dimension on the Y axis of the second lens 44G to be larger than the dimensions of the first lens 44B and the third lens 44R. Consequently, since the white light WL2, which is emitted to a light blocking region when the second lens 44G is absent, is taken in by the second lens 44G. Therefore, a light amount of the white light WL2 taken into the second lens 44G becomes larger than the light amount of the white light WL2 taken into the first lens 44B and the third lens 44R.

The brightness of the image light IM1 in the numerical value calculation pattern [7] increased 3% with respect to the numerical value calculation pattern [1]. This result is considered to have been obtained because, in the numerical value calculation pattern [7], the light amount of the green image light IG with respect to each of the blue image light IB and the red image light IR was higher than the light amount in the numerical value calculation pattern [1] and the visibility at the time of observation increased. In the numerical value calculation pattern [7], compared with the numerical value calculation pattern [1], a light amount difference of the green image light IG with respect to the blue image light IB and a light amount difference of the green image light IG with respect to the red image light IR are equal to each other. A spectrum of the image light IM1 in the numerical value calculation pattern [7] is closer to the human visibility compared with the spectrum in the numerical value calculation pattern [1]. However, the light amount difference of the green image light IG with respect to the blue image light IB and the light amount difference of the green image light IG with respect to the red image light IR in the numerical value calculation pattern [7] are smaller compared with the light amount differences in the numerical value calculation pattern [6]. Therefore, the brightness of the image light IM1 in the numerical value calculation pattern [7] was lower than the brightness of the image light IM1 in the numerical value calculation pattern [1] and was at a degree close to the brightness in the numerical value calculation pattern [2].

A color temperature of the image light IM1 in the numerical value calculation pattern [7] was calculated as 8288 [K] and a color deviation of the image light IM1 in the numerical value calculation pattern [7] was calculated as −0.009. The color temperature of the image light IM1 in the numerical value calculation pattern [7] is considered to have become slightly lower than the color temperature in the numerical value calculation pattern [1]. The image light IM1 in the numerical value calculation pattern [7] is considered to have become slightly more reddish compared with the image light IM1 in the numerical value calculation pattern [1]. As explained above, the color deviation of the image light IM1 in the numerical value calculation pattern [7] decreased to be smaller than the color deviation in the numerical value calculation pattern [1] because the relative light amount of the green image light IG included in the image light IM1 increased and the spectrum of the image light IM1 in the numerical value calculation pattern [7] came closer to the human visibility than in the numerical value calculation pattern [1]. Actually, the color deviation of the image light IM1 in the numerical value calculation pattern [7] was equal to the color deviation in the numerical value calculation pattern [2].

It is seen from the evaluation of the numerical value calculation patterns [1] to [7], in patterns in which the transmittance of the green light GL in the green filter 54G is higher than the transmittance of the red light RL in the red filter 54R and the transmittance of the blue light BL in the blue filter 54B like at least the numerical value calculation patterns [2], [3], [6], and [7], the brightness of the image light IM1 increased to be larger than the brightness in the numerical value calculation pattern [1] and the color deviation of the image light IM1 was reduced to be smaller than the color deviation in the numerical value calculation pattern [1]. As explained above, it was assumed that the transmittances per unit area of the three color filters, that is, the red filter 54R, the green filter 54G, and the blue filter 54B were equal to one another and it was assumed that the areas of the three color filters viewed along the Z axis were equal to one another. Therefore, by setting the area of the second lens 44G viewed along the Z axis larger than the area of each of the first lens 44B and the third lens 44R, the light amount of the green light GL transmitted through the green filter 54G can be increased to be larger than the light amount of the red light RL transmitted through the red filter 54R and the light amount of the blue light BL transmitted through the blue filter 54B. As a result, the light amount of the green image light IG included in the image light IM1 becomes larger than the light amounts of the blue image light IB and the red image light IR. The spectra of the full-color image lights IM1 and IM2 match the human visibility of the observer and correspond to the human visibility. Therefore, the brightness of the image lights IM1 and IM2 increases, color deviations of the white balance of the image lights IM1 and IM2 are reduced, and the visibility of the image lights IM1 and IM2 for the observer increases.

In the numerical value calculation pattern [6] among the numerical value calculation patterns [2], [3], [6], and [7], the light amount difference between the image lights IG and IB and the light amount difference between the image lights IG and IR were equal to each other and were 27%. when the light amount difference between the image lights IG and IB and the light amount difference between the image lights IG and IR are, for example, 20% or more and 40% or less, since the spectra of the image lights IM1 and IM2 satisfactorily match the human visibility, the brightness of the image lights IM1 and IM2 further increases. The color temperatures and the color deviations of the white balance of the image lights IM1 and IM2 can be adjusted by changing the light amount difference between the image lights IG and IB or the light amount difference between the image lights IG and IR. Note that the color temperatures and the color deviations of the image lights IM1 and IM2 are also adjusted when the peak wavelengths of the red light RL, the green light GL, and the blue light BL are changed.

The projector 301 in this embodiment explained above includes the light source device 10, the lens array 40, the color filter 52, the pixel electrode 62, and the projection optical system 90. The light source device 10 emits the white lights WL1 and WL2 including the blue light BL, the green light GL, and the red light RL. The lens array 40 is disposed on the optical path of the white light WL2 emitted from the light source device 10 and includes the plurality of microlenses 42. The microlenses 42 are equivalent to the "lens". The plurality of microlenses 42 include the first lenses 44B, the second lenses 44G, and the third lenses 44R. The color filter 52 is disposed on the optical path of the white light WL2 emitted from the lens array 40 and includes the blue filters 54B, the green filters 54G, and the red filters 54R. The blue filters 54B transmit the blue light BL included in the white light WL2 emitted from the first lenses 44B among the plurality of microlenses 42. The green filters 54G transmit the green light GL included in the white light WL2 emitted from the second lenses 44G among the plurality of microlenses 42. The red filters 54R transmit the red light RL included in the white light WL2 emitted from the third lenses 44R among the plurality of microlenses 42. The pixel electrode 62 is disposed on the optical paths of the red light RL, the green light GL, and the blue light BL transmitted through the color filter 52 and is disposed to face the color filter 52. The pixel electrode 62 includes the blue sub-pixel electrodes 66B, the green sub-pixel electrodes 66G, and the red sub-pixel electrodes 66R. The blue sub-pixel electrodes 66B modulate, according to image information, the blue light BL transmitted through the blue filters 54B and emit the blue image light IB. The green sub-pixel electrodes 66G modulate, according to the image information, the green light GL transmitted through the green filters 54G and emit the green image light IG. The red sub-pixel electrodes 66R modulate, according to the image information, the red light RL transmitted through the red filters 54R and emits the red image light IR. The projection optical system 90 is disposed on the optical paths of the blue image light IB, the green image light IG, and the red image light IR and projects the blue image light IB, the green image light IG, and the red image light IR. That is, the projection optical system 90 is disposed on the optical path of the image light IM2 obtained by combining the image lights IB, IG, and IR with one another and projects the image light IM2.

In the projector 301 in this embodiment, the plurality of microlenses 42 of the lens array 40 include the first lenses 44B that emit the white light WL2 toward the blue filters 54B, the second lenses 44G that emit the white light WL2 toward the green filters 54G, and the third lenses 44R that emit the white light WL2 toward the red filters 54R. The areas of the incident surface 44a and the emission surface 44b of the second lens 44G are larger than the area of the incident surface 54a of the green filter 54G and larger than the areas of the incident surface 44a and the emission surface 44b of the first lens 44B and the areas of the incident surface 44a and the emission surface 44b of the third lens 44R.

In the projector 301 in this embodiment, the size of the second lens 44G corresponding to the green light GL, that is, the area of the second lens 44G viewed along the optical axis AX and the Z axis is larger than the areas of the first lens 44B corresponding to the blue light BL and the third lens 44R corresponding to the red light RL. With the projector 301 in this embodiment, a light amount of the green light GL made incident on the green sub-pixel electrode 66G using the second lens 44G can be increased to be larger than a light amount of the blue light BL made incident on the blue sub-pixel electrode 66B using the first lens 44B and a light amount of the red light RL made incident on the red sub-pixel electrode 66R using the third lens 44R. That is, a larger amount of the green light GL can be made incident on the green sub-pixel electrode 66G using the second lens 44G and the green filter 54G. As a result, in an image and a video projected from the projector 301 in this embodiment, it is possible to easily increase the brightness of the green image light IG, for which the human visibility is high, to be higher than the brightness of the blue image light IB and the red image light IR. With the projector 301 in this embodiment, the observer can visually recognize an image and a video displayed on the screen or the like more brightly than an image and a video projected by the projector of the related art. That is, with the projector 301 in this embodiment, even when light amount ratios of the red light RL, the green light GL, and the blue light BL included in the white lights WL1 and WL2 emitted from the light source device 10 are equal to one another, the light amount of the green image light IG included in the image light IM2 can be increased to be larger than the light amounts of the blue image light IB and the red image light IR. Therefore, with the projector 301 in this embodiment, illumination ratios and spectra of red, green, and blue image lights in an image and a video to be projected can be adjusted to the visibility of a human observing the image and the video. It is possible to realize an image and a video recognized more brightly than an image and a video projected by the projector of the related art.

As a method of adjusting spectra of the image lights IM1 and IM2 emitted from the light modulation device 50 to the human visibility and changing white balance, for example, a method of changing characteristics of each of the red filters 54R, the green filters 54G, and the blue filters 54B of the color filter 52, that is, a method of changing the transmittance of the red light RL in the red filters 54R, the transmittance of the green light GL in the green filters 54G in the green filter 54G, and the transmittance of the blue light BL in the blue filters 54B in the blue filter 54B is conceivable.

As another method of adjusting spectra of the image lights IM1 and IM2 to the human visibility and changing white balance, a method of changing the area of each of the green sub-pixel electrodes 66G and the blue sub-pixel electrodes 66B viewed along the Z axis is conceivable. However, in these methods, the light modulation device 50 including the color filter 52 and the pixel electrodes 62 needs to be individually designed according to white balance of the image lights IM1 and IM2 that should be realized. This leads to an increase in cost of the projector 301.

On the other hand, with the projector 301 in this embodiment, the areas of the first lens 44B, the second lens 44G, and the third lens 44R of the lens array 40, which is a component separate from the light modulation device 50, can be suitably set according to spectra matching the human visibility to be adjusted to the transmittance of the color lights of the color filters, the areas of the color sub-pixel electrodes, and the like in the light modulation device 50. The area of the second lens 44G can be set larger than the areas of the first lens 44B and the third lens 44R. With this method, the cost of the projector 301 can be reduced compared with when the light modulation device 50 is individually designed.

As another method of adjusting spectra of the image lights IM1 and IM2 to the human visibility and changing white balance, a method of suitably adjusting, according to spectra matching the human visibility, gradation in each of the red sub-pixel electrodes 66R, the green sub-pixel electrodes 66G, and the blue sub-pixel electrodes 66B of the pixel electrode 62 is conceivable. However, with this method, the brightness of the image lights IM1 and IM2 decreases.

In order to adjust the spectra of the image lights IM1 and IM2 to the human visibility, a light amount of the green light GL included in the image lights IM1 and IM2 is preferably equal to or more than 110% and equal to or less than 150% and more preferably equal to or more than 120% and equal to or less than 140% with respect to a light amount of each of the red light RL and the blue light BL included in the image lights IM1 and IM2.

Note that the lens array 40 may be in contact with the light modulation device 50 on the Z axis. when the lens array 40 and the light modulation device 50 are components separate from each other, for example, the emission surfaces 44b of the first lenses 44B, the second lenses 44G, and the third lenses 44R of the lens array 40 may be in contact with the incident surface 52a of the color filter 52 of the light modulation device 50. In this case, a separation distance on the Z axis between the lens array 40 and the light modulation device 50 is extremely short and the separation distance PL is reduced. Therefore, the microlenses 42 of the lens array 40 need to have high power. A spot diameter of color light at each of the condensing points MR, MG, and MB decreases. On the other hand, there is an advantage that it is easy to align the microlenses 42 and the color filters corresponding thereto and positional deviation between the microlenses 42 and the color filters corresponding thereto less easily occurs.

When the lens array 40 and the light modulation device 50 are separated from each other on the Z axis as in the projector 301 in this embodiment, since the separation distance PL is long compared with when the lens array 40 and the light modulation device 50 are in contact with each other as explained above, the microlenses 42 of the lens array 40 may have low power. The spot diameter of the color light at each of the condensing points MR, MG, and MB increases. Restrictions on the material of the microlenses 42, a shape error and the like allowed at the time of manufacturing, and the like decrease. On the other hand, accurate alignment of the microlenses 42 and the color filters corresponding thereto is necessary.

In the projector 301 in this embodiment, the first lenses 44B, the second lenses 44G, and the third lenses 44R of the lens array 40 are disposed along the X axis and the Y axis. Note that the Z axis is an axis parallel to the optical axis AX of the white light WL2 made incident on the lens array 40 and is equivalent to the "first axis". The X axis is orthogonal to the Z axis and is equivalent to the "second axis". The Y axis is orthogonal to the Z axis and the X axis and is equivalent to the "third axis". On the X axis, the width XG of the second lens 44G is larger than the width XB of the first lens 44B and the width XR of the third lens 44R. Specifically, in the projector 301 in this embodiment, the red filters 54R, the green filters 54G, and the blue filters 54B of the color filter 52 of the light modulation device 50 are sequentially repeatedly disposed on the X axis. The red sub-pixel electrodes 66R, the green sub-pixel electrodes 66G, and the blue sub-pixel electrodes 66B of the pixel electrode 62 of the light modulation device 50 are sequentially repeatedly disposed along the X axis according to the disposition of the color filters. The third lenses 44R, the second lenses 44G, and the first lenses 44B of the lens array 40 are sequentially repeatedly disposed along the X axis according to the disposition of the color filters and the sub-pixel electrodes explained above.

With the projector 301 in this embodiment, since the width XG of the second lens 44G is larger than the width XB of the first lens 44B and the width XR of the third lens 44R, a light amount of the white light WL2 taken into the second lens 44G can be increased to be larger than a light amount of the white light WL2 taken into each of the first lens 44B and the third lens 44R on the X axis. As a result, the brightness of the image lights IM1 and IM2 can be increased. The observer can observe an image and a video more brightly than an image and a video projected by the projector of the related art.

In the projector 301 in this embodiment, when viewed along the Z axis, the end portion on the −X side of the second lens 44G of the lens array 40 overlaps the red filter 54R of the color filter 52. When viewed along the Z axis, the end portion on the +X side of the second lens 44G of the lens array 40 overlaps the blue filter 54B of the color filter 52. The end portion on the −X side and the end portion on the +X side of the second lens 44G are equivalent to the "part of the second lens".

In the projector 301 in this embodiment, when the end portion on the −X side of the second lens 44G does not overlap the red filter 54R, the white light WL2 passing through the red filter 54R is collected on the green filter 54G by the second lens 44G and passes through the green filter 54G. Similarly, when the end portion on the +X side of the second lens 44G does not overlap the blue filter 54B, the white light WL2 passing through the blue filter 54B is collected on the green filter 54G by the second lens 44G and passes through the green filter 54G. With the projector 301 in this embodiment, a light amount of the white light WL2 made incident on the green filter 54G can be increased and light amounts of the white light WL2 made incident on the red filter 54R and the blue filter 54B can be reduced by the end portion on the −X side and the end portion on the +X side of the second lens 44G. As a result, the differences between a light amount of the green light GL transmitted through the green filter 54G and light amounts of the red light RL transmitted through the red filter 54R and the blue light BL transmitted through the blue filter 54B increase. With the projector 301 in this embodiment, a spectrum of the image light IM2 to be projected can be easily adjusted to the visibility of a human observing the spectrum.

In the projector 301 in this embodiment, the color filter 52 includes, in a plane orthogonal to the optical axis AX of the white light WL2, between any filters of the red filter 54R, the green filter 54G, and the blue filter 54B adjacent to one another, the light blocking region 56 that blocks the white light WL2. The light blocking region 56 is provided, on the X axis, in a region further on the −X side than the red filter 54R disposed most on the −X side in the color filter 52, a region between the red filter 54R and the green filter 54G, a region between the green filter 54G and the blue filter 54B, a region between the blue filter 54B and the red filter 54R, and a region further on the +X side than the blue filter 54B disposed most on the +X side in the color filter 52. The light blocking region 56 is provided, on the Y axis, in a region further on the +Y side than each of the red filter 54R, the green filter 54G, and the blue filter 54B disposed most on the +Y side in the color filter 52, a region between the red filters 54R adjacent to each other, a region between the green filters 54G adjacent to each other, a region between the blue filters 54B adjacent to each other, and a region further on the −Y side than each of the red filter 54R, the green filter 54G, and the blue filter 54B disposed most on the −Y side in the color filter 52.

In the projector 301 in this embodiment, when viewed along the Z axis, the first lens 44B, the second lens 44G, and the third lens 44R overlap the light blocking region 56. Therefore, the white light WL2 that is emitted to the light blocking region 56 and is not utilized as the image lights IM1 and IM2 when the first lens 44B, the second lens 44G, and the third lens 44R are absent can be allowed to pass through the blue filter 54B, the green filter 54G, and the red filter 54R using the lenses. As a result, a maximum light amount of color light passing through each of the first lens 44B, the second lens 44G, and the third lens 44R increases compared with when the light blocking region 56 is not provided. With the projector 301 in this embodiment, an adjustable range of the area of each of the first lens 44B, the second lens 44G, and the third lens 44R can be enlarged according to the width on the X axis and the Y axis of the light blocking region 56. Consequently, it is possible to increase flexibility of adjustment of spectra in the image lights IM1 and IM2.

In the projector 301 in this embodiment, the red filters 54R, the green filters 54G, and the blue filters 54B of the color filter 52 are disposed along the X axis and the Y axis in the XY plane as explained above. The XY plane is equivalent to the "surface crossing the first axis". The light blocking region 56 is disposed in a region extending in parallel to the Y axis between the red filter 54R and the green filter 54G adjacent to each other on the X axis, a region extending in parallel to the Y axis between the green filter 54G and the blue filter 54B adjacent to each other on the X axis, and a region extending in parallel to the Y axis between the blue filter 54B and the red filter 54R adjacent to each other on the X axis. The light blocking region 56 is disposed in a region extending in parallel to the X axis between the red filters 54R adjacent to each other on the Y axis, a region extending in parallel to the X axis between the green filters 54G adjacent to each other on the Y axis, and a region between the blue filters 54B adjacent to each other on the Y axis. Further, the light blocking region 56 is disposed in a region extending in parallel to the Y axis further on the −X side than the red filter 54R disposed most on the −X side in the color filter 52 and a region extending in parallel to the Y axis further on the +X side than the blue filter 54B disposed most on the +X side. That is, when viewed along the Z axis, the light blocking region 56 is disposed in a region extending in parallel to the X axis and a region extending in parallel to the Y axis at a peripheral edge portion further on the outer side than a region where the plurality of color filters are disposed in the color filter 52. In the projector 301 in this embodiment, the width y2 on the Y axis of the light blocking region 56 extending in parallel to the X axis is larger than the width x2 on the X axis of the light blocking region extending in parallel to the Y axis. The first lenses 44B, the second lenses 44G, and the third lenses 44R of the lens array 40 have power on the Y axis.

In the projector 301 in this embodiment, since the width y2 of the light blocking region 56 is larger than the width x2, an adjustable width on the Y axis of each of the first lenses 44B, the second lenses 44G, and the third lenses 44R can be secured larger than an adjustable width on the X axis.

In the projector 301 in this embodiment, when viewed along the Z axis, the principal point HB of the first lens 44B of the lens array 40 overlaps the center of the blue filter 54B of the color filter 52 and the center of the blue sub-pixel electrode 66B of the pixel electrode 62. The principal point HG of the second lens 44G of the lens array 40 overlaps the center of the green filter 54G of the color filter 52 and the center of the green sub-pixel electrode 66G of the pixel electrode 62. The principal point HR of the third lens 44R of the lens array 40 overlaps the center of the red filter 54R of the color filter 52 and the center of the red sub-pixel electrode 66R of the pixel electrode 62.

In the projector 301 in this embodiment, when viewed along the Z axis, the white light WL2 emitted from the first lens 44B is less easily blocked by the peripheral end of the blue filter 54B and the blue light BL transmitted through the blue filter 54B is less easily blocked by the peripheral end of the blue sub-pixel electrode 66B. Therefore, the blue light BL can be efficiently made incident on the blue sub-pixel electrode 66B. Similarly, when viewed along the Z axis, the white light WL2 emitted from the second lens 44G is less easily blocked by the peripheral end of the green filter 54G and the green light GL transmitted through the green filter 54G is less easily blocked by the peripheral end of the green sub-pixel electrode 66G. Therefore, the green light GL can be efficiently made incident on the green sub-pixel electrode 66G. Similarly, when viewed along the Z axis, the white light WL2 emitted from the third lens 44R is less easily blocked by the peripheral end of the red filter 54R and the red light RL transmitted through the red filter 54R is less easily blocked by the peripheral end of the red sub-pixel electrode 66R. Therefore, the red light RL can be efficiently made incident on the red sub-pixel electrode 66R.

Subsequently, modifications of the embodiment of the present disclosure are explained.

Note that, in the modifications, components common to the embodiment explained above are denoted by the same reference numerals and signs as the reference numerals and signs of the components in the embodiment corresponding to the components and redundant explanation of the explanation in the embodiment is omitted. In the modifications, components and contents different from the components and the contents in the embodiment explained above are explained.

First Modification

Figure 6:
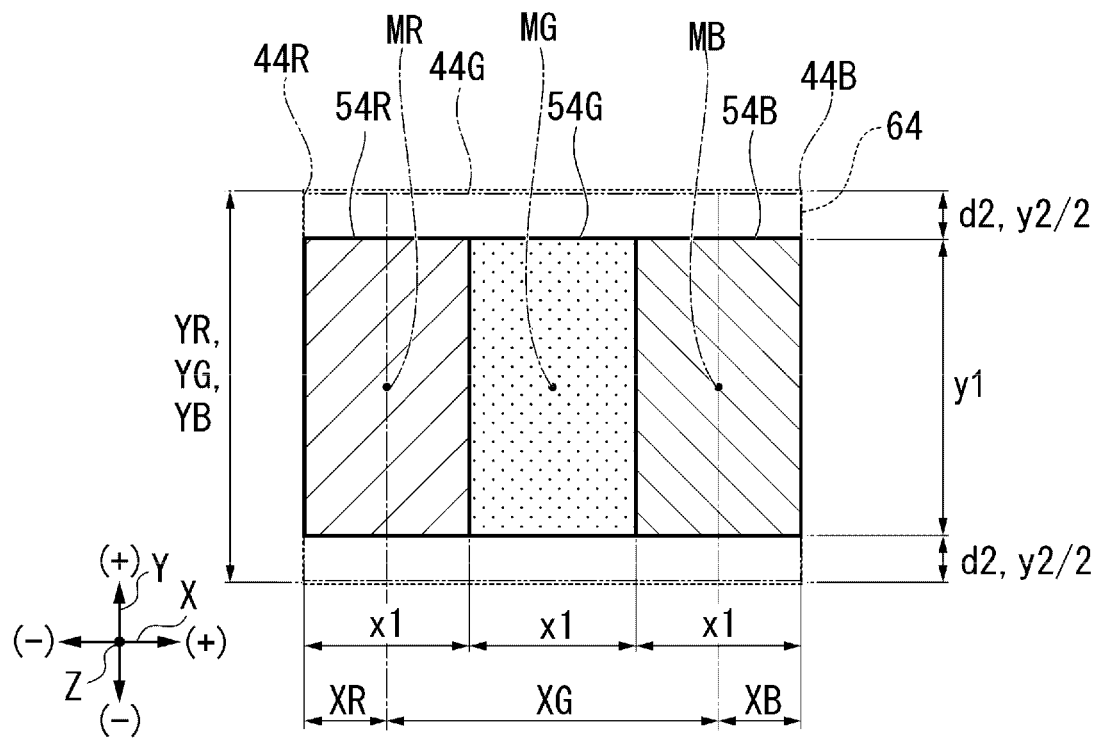
FIG. 6 is a schematic diagram of the lens array and the color filter of the light modulation device of the projector in a first modification of the embodiment.

FIG. 6 is a schematic diagram of the lens array 40 and the color filter 52 of the light modulation device 50 of the projector 301 in a first modification of the embodiment of the present disclosure and is a front view of the lens array 40 and the color filter 52 viewed from the −Z side along the Z axis. As shown in FIG. 6, in the first modification, for example, in the pixel electrode 62 of the light modulation device 50, the wiring region 68 between the red sub-pixel electrode 66R and the green sub-pixel electrode 66G on the X axis and the wiring region 68 between the green sub-pixel electrode 66G and the blue sub-pixel electrode 66B on the X axis of each of the pixels 64 may not be provided. According to such a configuration, in the color filter 52 of the light modulation device 50, the light blocking region 56 between the red filter 54R and the green filter 54G on the X axis and the light blocking region 56 between the green filter 54G and the blue filter 54B on the X axis may not be provided.

In the projector 301 in the first modification as well, the width XB on the X axis of the first lens 44B, the width XG on the X axis of the second lens 44G, and the width XR on the X axis of the third lens 44R are respectively set such that the area of the second lens 44G is appropriately larger than the areas of the first lens 44B and the third lens 44R. "Appropriately" described above means a state in which spectra of the image lights IM1 and IM2 correspond to the human visibility such that desired brightness of the image light IM2 to be projected can be obtained. In the projector 301 in the first modification, the same action effects as the action effects of the projector 301 in the embodiment explained above can be obtained. With the projector 301 in the first modification, an image and a video visually recognized more brightly than an image and a video projected by the projector of the related art can be realized according to the visibility of a human observing brightness of red, green, and blue image lights in an image and a video to be projected.

Second Modification

Although not shown, in a second modification, for example, in the pixel electrode 62 of the light modulation device 50, the wiring region 68 between the red sub-pixel electrodes 66R on the Y axis, the wiring region 68 between the green sub-pixel electrodes 66G on the Y axis, and the wiring region 68 between the blue sub-pixel electrodes 66B on the Y axis may not be provided.

In the second modification as well, the width XB of the first lens 44B, the width XG of the second lens 44G, and the width XR of the third lens 44R are respectively set such that the area of the second lens 44G is appropriately larger than the areas of the first lens 44B and the third lens 44R. With the projector 301 in the second modification, since the same action effects as the action effects of the projector 301 in the embodiment explained above can be obtained, an image and a video visually recognized more brightly than an image and a video projected by the projector of the related art can be realized according to the visibility of a human observing brightness of red, green, and blue image lights in an image and a video to be projected.

Third Modification

Although not shown, in a third modification, for example, the wiring region 68 may be disposed outside the region of each of the pixels 64 of the pixel electrode 62 when viewed along the Z axis. The width x2 on the X axis and the width y2 on the Y axis of the wiring region 68 may be negligibly extremely small in each of the pixels 64. According to the disposition of the pixel electrode 62, the light blocking region 56 may be disposed outside the region of the set of the red filter 54R, the green filter 54G, and the blue filter 54B of the color filter 52 when viewed along the Z axis. The width x2 on the X axis and the width y2 on the Y axis of the light blocking region 56 may be negligibly extremely small. In such a disposition configuration, when viewed along the Z axis, all of the first lenses 44B, the second lenses 44G, and the third lenses 44R of the microlenses 42 of the lens array 40 sometimes do not overlap the light blocking region 56.

In the third modification as well, the widths XB and YB of the first lens 44B, the widths XG and YG of the second lens 44G, and the widths XR and YR of the third lens 44R are respectively set such that the area of the second lens 44G is appropriately larger than the areas of the first lens 44B and the third lens 44R. With the projector 301 in the third modification, since the same action effects as the action effects of the projector 301 in the embodiment explained above can be obtained, an image and a video visually recognized more brightly than an image and a video projected by the projector of the related art can be realized according to the visibility of a human observing brightness of red, green, and blue image lights in an image and a video to be projected.

As illustrated in the first modification to the third modification, the disposition and the widths of the light blocking region 56 in the color filter 52 of the light modulation device 50 and the wiring region 68 of the pixel electrode 62 viewed along the Z axis are not limited to the disposition and the widths in the embodiment explained above and may be changed as appropriate.

Fourth Modification

Figure 7:
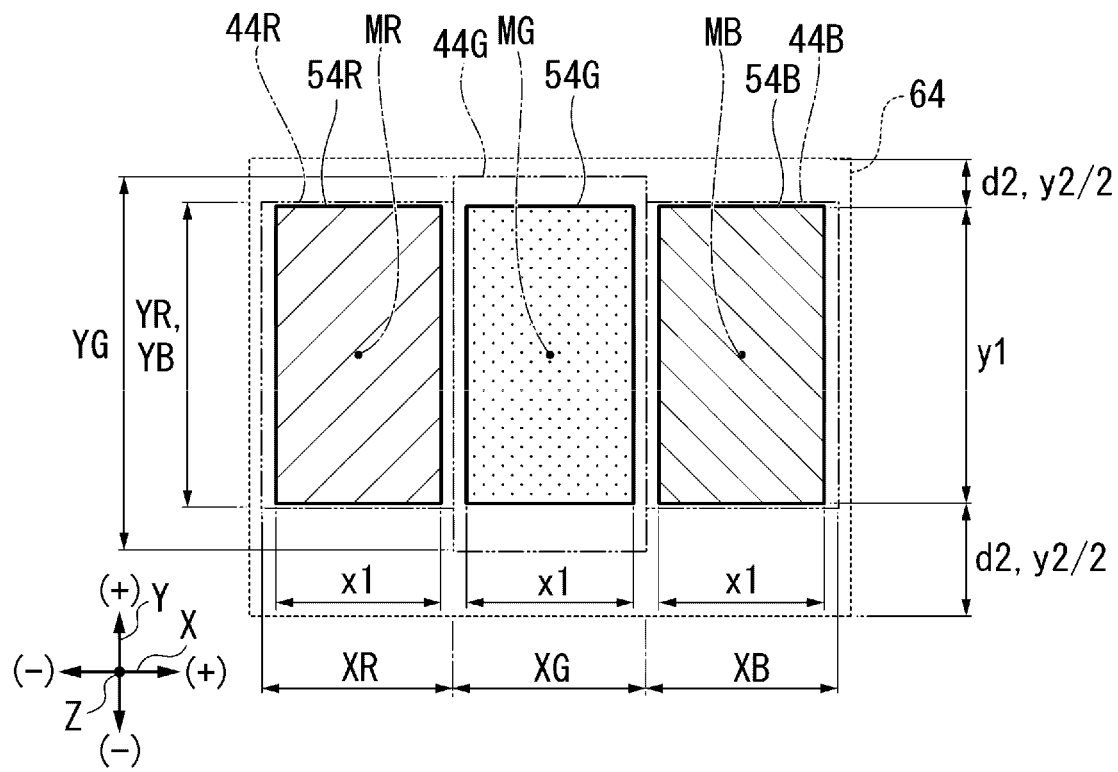
FIG. 7 is a schematic diagram of the lens array and the color filter of the light modulation device of the projector in a fourth modification of the embodiment.

FIG. 7 is a schematic diagram of the lens array 40 and the color filter 52 of the light modulation device 50 of the projector 301 in a fourth modification of the embodiment of the present disclosure and is a front view of the lens array 40 and the color filter 52 viewed from the −Z side along the Z axis. As shown in FIG. 7, in the fourth modification, for example, the width XB of the first lens 44B, the width XG of the second lens 44G, and the width XR of the third lens 44R of the lens array 40 are equal to one another. On the other hand, the width YG of the second lens 44G is larger than the width YB of the first lens 44B and the width YR of the third lens 44R.

In the fourth modification as well, the width YB of the first lens 44B, the width YG of the second lens 44G, and the width YR of the third lens 44R are respectively set such that the area of the second lens 44G is appropriately larger than the areas of the first lens 44B and the third lens 44R. With the projector 301 in the fourth modification, since the same action effects as the action effects of the projector 301 in the embodiment explained above can be obtained, an image and a video visually recognized more brightly than an image and a video projected by the projector of the related art can be realized according to the visibility of a human observing brightness of red, green, and blue image lights in an image and a video to be projected.

In the fourth modification, when viewed along the Z axis parallel to the optical axis AX of the white light WL2 made incident on the lens array 40, the second lens 44G does not overlap the blue filter 54B and the red filter 54R. The configuration in the fourth modification is suitable when the light blocking region 56 having sufficient width y2 is provided in the color filter 52 and the wiring region 68 having sufficient width y2 is provided in the pixel electrode 62 in order to set the area of the second lens 44G appropriately larger than the areas of the first lens 44B and the third lens 44R.

Note that, although not shown, when viewed along the Z axis, a part of the second lens 44G may overlap one color filter of the blue filter 54B and the red filter 54R in order to set the area of the second lens 44G appropriately larger than the areas of the first lens 44B and the third lens 44R. One color filter is selected according to a desired color temperature and a desired color deviation of white balance realized by the image lights IM1 and IM2.

Although not shown, in the configuration in the fourth modification, further, the width XG of the second lens 44G of the lens array 40 may be larger than the width XB of the first lens 44B and the width XR of the third lens 44R. In this case, when the widths on the X axis are increased, the differences between the area of the second lens 44G and the areas of the first lens 44B and the third lens 44R increase. The action effects described above can be obtained by setting the area of the second lens 44G appropriately larger than the areas of the first lens 44B and the third lens 44R.

Fifth Modification

Figure 8:
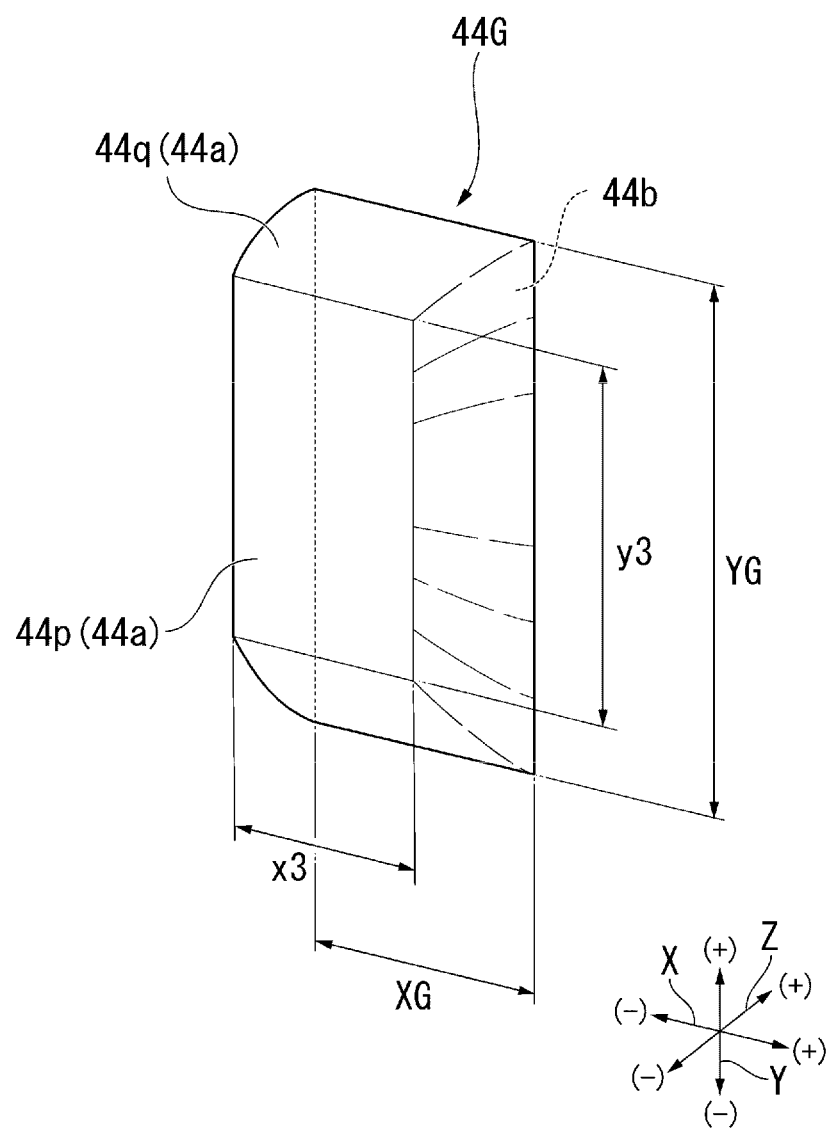
FIG. 8 is a schematic diagram of the lens array and the color filter of the light modulation device of the projector in a fifth modification of the embodiment.
Figure 9:
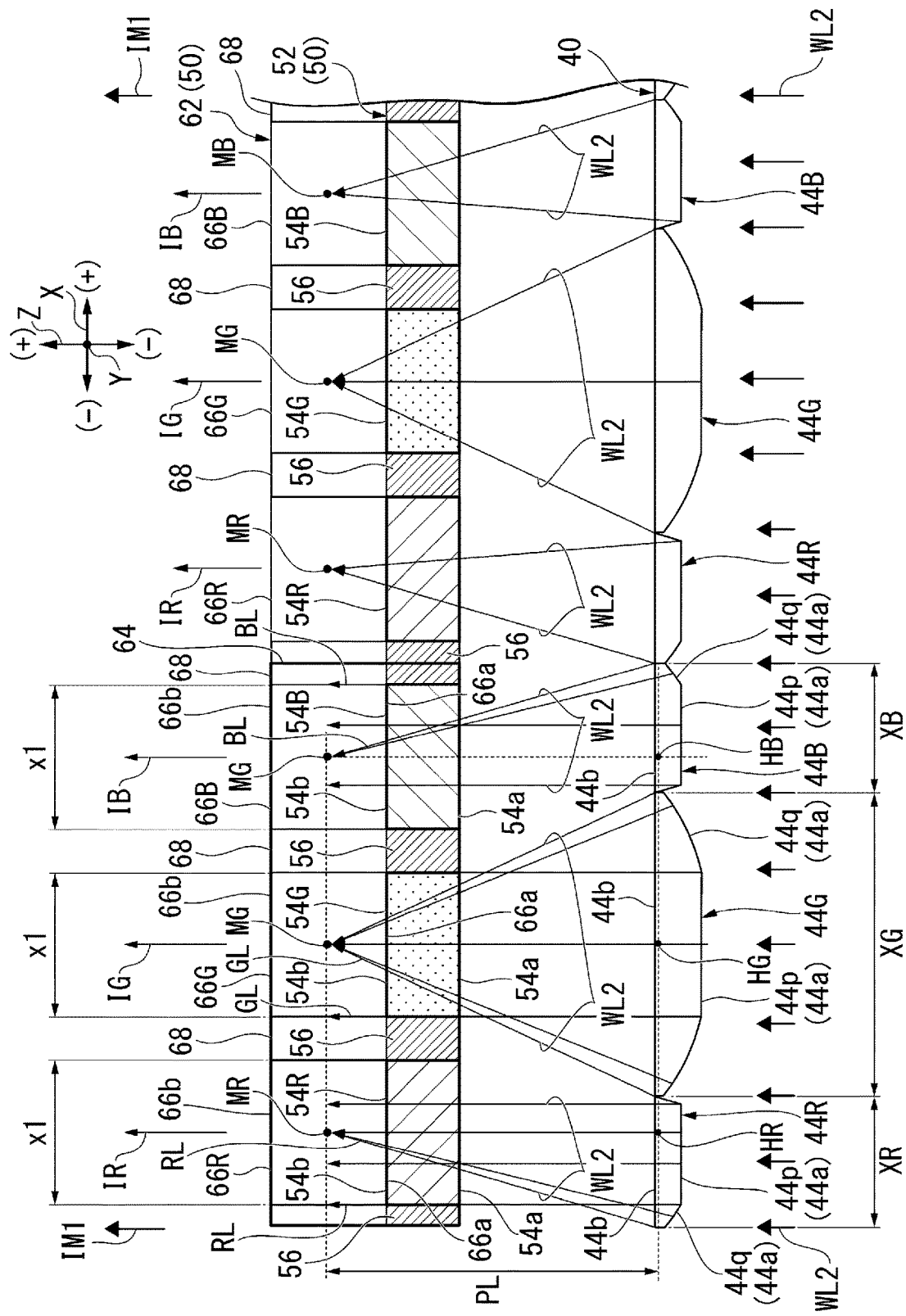
FIG. 9 is a schematic diagram of the lens array and the light modulation device of the projector shown in FIG. 8 and is a sectional view thereof in arrow view taken along the C1-C1 line shown in FIG. 2.
Figure 10:
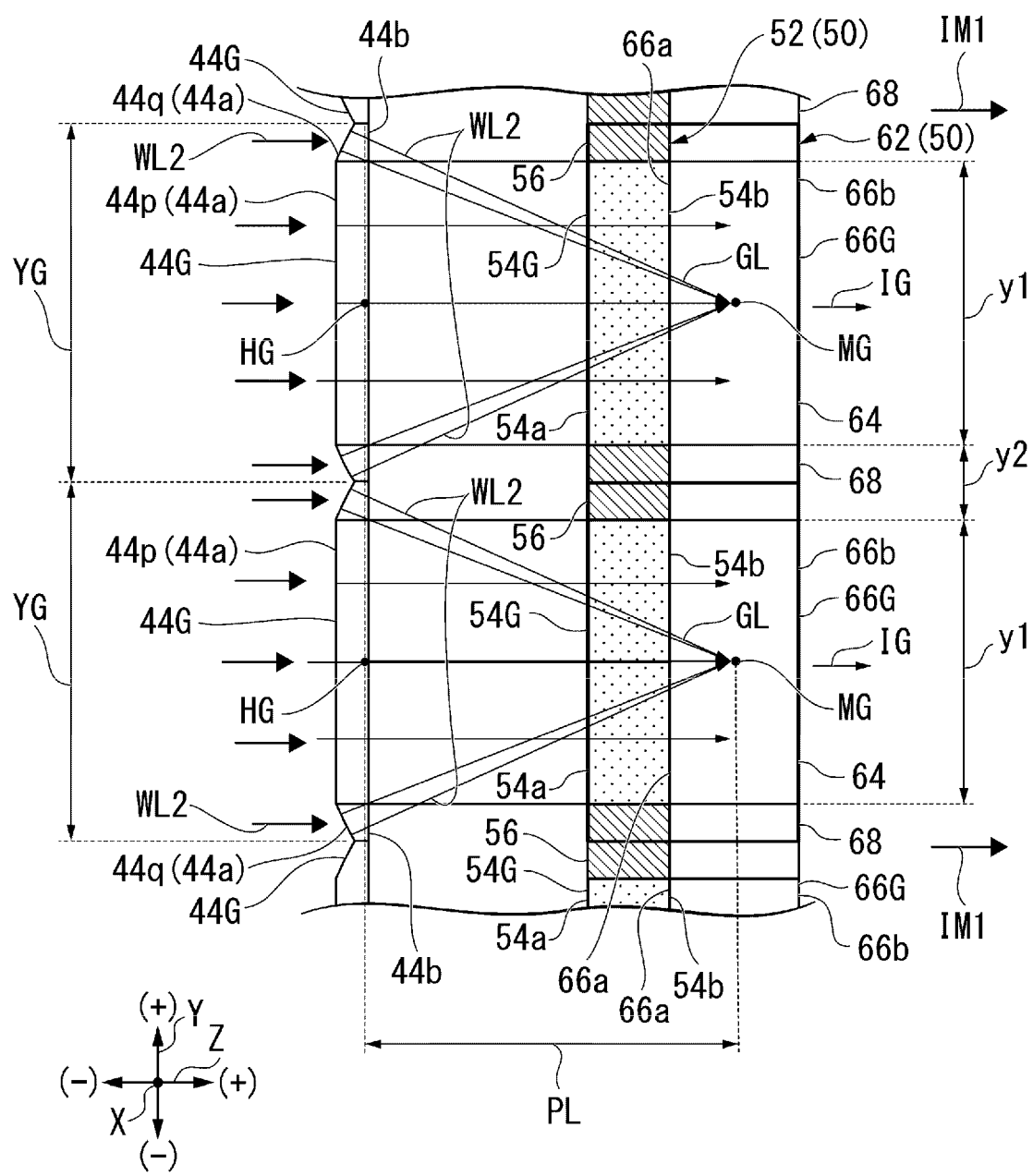
FIG. 10 is a schematic diagram of the lens array and the light modulation device of the projector shown in FIG. 8 and is a sectional view thereof in arrow view taken along the C2-C2 line shown in FIG. 2.

FIG. 8 is a perspective view of the second lens 44G of the lens array 40 of the projector 301 in a fifth modification of the embodiment of the present disclosure. FIG. 9 is a schematic diagram of the lens array 40 and the color filter 52 and the pixel electrode 62 of the light modulation device 50 in the fifth modification and is a sectional view thereof in arrow view taken along the C1-C1 line shown in FIG. 2. FIG. 10 is a schematic diagram of the lens array 40 and the color filter 52 and the pixel electrode 62 of the light modulation device 50 in the fifth embodiment and is a sectional view thereof in arrow view taken along the C2-C2 line shown in FIG. 2.

As shown in FIGS. 8 to 10, the incident surface 44a of the second lens 44G of the lens array 40 includes an incident surface 44p and an incident surface 44q. Width x3 on the X axis of the incident surface 44p is the same as the width x1 of the green filter 54G of the color filter 52. The incident surface 44p is a flat surface parallel to the XY plane. Width y3 on the Y axis of the incident surface 44p is the same as the width y1 of the green filter 54G. When viewed along the Z axis, the incident surface 44p overlaps the green filter 54G and the green sub-pixel electrode 66G of the pixel electrode 62.

The incident surface 44q is, for example, a part of a curved surface convex to the −Z side with the same position as the condensing point MG set as a vertex on the X axis and the Y axis and is a part of a curved surface designed according to the separation distance PL. The incident surface 44q is configured with the remaining portion excluding a portion overlapping the green filter 54G and the green sub-pixel electrode 66G when viewed along the Z axis in the curved surface explained above and is the curved surface explained above disposed between the width x1 and the width XG on the X axis and between the width y1 and the width YG on the Y axis centering on the principal point HG when viewed along the Z axis.

Since the second lens 44G includes the incident surfaces 44p and 44q as the incident surface 44a as explained above, when viewed along the Z axis, the second lens 44G does not have power in a portion overlapping the green filter 54G and has positive power in a portion not overlapping the green filter 54G. Therefore, in the white light WL2 made incident on the incident surface 44a of the second lens 44G, the white light WL2 made incident on the incident surface 44p in a region overlapping the green filter 54G when viewed along the Z axis travels straight along the Z axis without being refracted on the X axis and the Y axis and is made incident on the green filter 54G. The green light GL transmitted through the green filter 54G is emitted to the +Z side along the Z axis, made incident on the green sub-pixel electrode 66G, and converted into the green image light IG.

In the fifth modification as well, the width XB of the first lens 44B, the width XG of the second lens 44G, and the width XR of the third lens 44R are respectively set such that the area of the second lens 44G is appropriately larger than the areas of the first lens 44B and the third lens 44R. The green lights GL included in the white light WL2 made incident on the incident surfaces 44p and 44q of the second lens 44G travel in different routes each other. However, as a result, the green lights GL are made incident on the same green sub-pixel electrode 66G and converted into the green image light IG. Therefore, with the projector 301 in the fifth modification, since the same action effects as the action effects of the projector 301 in the embodiment explained above can be obtained, an image and a video visually recognized more brightly than an image and a video projected by the projector of the related art can be realized according to the visibility of a human observing brightness of red, green, and blue image lights in an image and a video to be projected.

In the fifth modification, the center of the incident surface 44a of the second lens 44G viewed along the Z axis is configured with the incident surface 44p, which is the flat surface parallel to the XY plane. In the configuration in the fifth modification, it is possible to reduce the thickness on the Z axis of the second lens 44G and achieve a reduction in the thickness of the second lens 44G compared with when the incident surface 44a of the second lens 44G is configured with one curved surface and the entire incident surface 44a has positive power.

With the projector 301 in the fifth modification, the light intensity of the green light GL made incident on the green sub-pixel electrode 66G can be dispersed in the entire green sub-pixel electrode 66G. Therefore, it is possible to suppress generation of the green light GL locally having high light intensity in the green sub-pixel electrode 66G and reduce a load that occurs when the green light GL locally having high light intensity is generated.

Note that, in the fifth modification, as shown in FIGS. 9 and 10, the first lens 44B may not have power in a portion overlapping the blue filter 54B and the blue sub-pixel electrode 66B and may have positive power in a portion not overlapping the blue filter 54B and the blue sub-pixel electrode 66B. The third lens 44R may not have power in a portion overlapping the red filter 54R and the red sub-pixel electrode 66R and may have positive power in a portion not overlapping the red filter 54R and the red sub-pixel electrode 66R. That is, at least one lens of the first lens 44B, the second lens 44G, and the third lens 44R may not have power in a portion overlapping a color filter disposed to correspond to the lens when viewed along the Z axis and may have positive power in a portion not overlapping the color filter disposed to correspond to the lens.

In the fifth modification, at least a part of the white light WL2 emitted to the +Z side generally along the Z axis from both the ends on the X axis and both the ends on the Y axis of the incident surface 44p of the second lens 44G is likely to be blocked by the light blocking region 56 adjacent, on the X axis and the Y axis, to the green filter 54G disposed to correspond to the second lens 44G. In order to suppress a loss of the white light WL2, when at least one lens of the first lens 44B, the second lens 44G, and the third lens 44R includes the incident surfaces 44p and 44q as the incident surface 44a, the width f the incident surface 44p of the lens may be x3 of appropriately smaller than the width x1 and the width y3 of the incident surface 44p of the lens may be appropriately smaller than the width y1.

Sixth Modification

Although not shown, in a sixth modification, when viewed along the Z axis parallel to the optical axis AX of the white light WL2 made incident on the lens array 40, the principal points HR and HB of at least one lens of the first lens 44B and the third lens 44R of the lens array 40 may not overlap the center of a color filter of the color filter 52 disposed to correspond to the lens and may be disposed in a position different from the center of the color filter disposed to correspond to the lens.

In the sixth modification, for example, when viewed along the Z axis, the principal point HR and the condensing point MR of the third lens 44R may be disposed further on the +X side than the center on the X axis of the red filter 54R. The principal point HB and the condensing point MB of the first lens 44B may be disposed further on the −X side than the center on the X axis of the blue filter 54B. In this case, a light beam of the white light WL2 emitted from the third lens 44R and condensed on the condensing point MR tends to pass the center portion on the X axis of the red filter 54R. Therefore, a loss of the white light WL2 and the red light RL can be suppressed. Similarly, a light beam of the white light WL2 emitted from the first lens 44B and condensed on the condensing point MB tends to pass the center portion on the X axis of the blue filter 54B. Therefore, a loss of the white light WL2 and the blue light BL can be suppressed.

In the sixth modification as well, the widths XB and YB of the first lens 44B, the widths XG and YG of the second lens 44G, and the widths XR and YR of the third lens 44R are respectively set such that the area of the second lens 44G is appropriately larger than the areas of the first lens 44B and the third lens 44R. Therefore, with the projector 301 in the sixth modification, since the same action effects as the action effects of the projector 301 in the embodiment explained above can be obtained, an image and a video visually recognized more brightly than an image and a video projected by the projector of the related art can be realized according to the visibility of a human observing brightness of red, green, and blue image lights in an image and a video to be projected.

Seventh Modification

Although not shown, in a seventh modification, when viewed along the Z axis, positive power of the microlens 42 disposed in an outer periphery centering on the optical axis AX of the white light WL2 among the plurality of microlenses 42 disposed in the lens array 40 may be stronger than positive power of the microlens 42 disposed on the center centering on the optical axis AX. For example, the condensing points MB, MG, and MR of the first lens 44B, the second lens 44G, and the third lens 44R of the microlens 42 disposed in the outer periphery of the lens array 40 are disposed in the centers on the X axis, the Y axis, and the Z axis of the blue sub-pixel electrode 66B, the green sub-pixel electrode 66G, and the red sub-pixel electrode 66R of the pixel electrode 62. Consequently, the white light WL2 made incident on the microlens 42 disposed in the outer periphery of the lens array 40 is made incident on the color filter disposed to correspond to the microlens 42 as in the projector 301 in the embodiment explained above. The red light RL, the green light GL, or the blue light BL transmitted through each of the color filters is efficiently made incident on the color sub-pixel electrode corresponding to the color filter.

On the other hand, the condensing points MB, MG, and MR of the first lens 44B, the second lens 44G, and the third lens 44R of the microlens 42 disposed in the center of the lens array 40 are disposed in the centers on the X axis and the Y axis of the blue sub-pixel electrode 66B, the green sub-pixel electrode 66G, and the red sub-pixel electrode 66R and, on the Z axis, are disposed in regions further on the +Z side than the emission surfaces 66b of blue sub-pixel electrode 66B, the green sub-pixel electrode 66G, and the red sub-pixel electrode 66R. On each of the X axis and the Y axis, a curvature radius of the incident surfaces 44a of the first lens 44B, the second lens 44G, and the third lens 44R in the center of the lens array 40 centering on the optical axis AX is larger than a curvature radius of the incident surfaces 44a of the first lens 44B, the second lens 44G, and the third lens 44R in the outer periphery of the lens array 40. In this case, a part of the white light WL2 made incident on the microlens 42 disposed in the center of the lens array 40 is blocked by the light blocking region 56 adjacent to, on the XY plane, the color filter disposed to correspond to the microlens 42 and is not made incident on the color sub-pixel electrode corresponding to the color filter.

The projector 301 in this embodiment is the single plate type projector as explained above. In the single plate type projector, white light including blue light, green light, and red light is converted into full-color image light by one light modulation device. As components other than the single plate type projector, a two plate type projector and a three plate type projector are known. In the two plate type projector, two light modulation devices are used. For example, one color light of blue light, green light, and red light is converted into image light in time series by one light modulation device. The other color light of the green light and the red light is converted into image light in synchronization with one color light by the other light modulation device. In the three plate type projector, three light modulation devices are used. Each color light of blue light, green light, and red light is converted into image light by each of the light modulation devices. The number of components of the single plate type projector including the projector 301 in this embodiment is reduced to be smaller than the numbers of components of the two plate type projector and the three plate type projector. On the other hand, in the single plate type projector, the areas of an incident surface and an emission surface of the one light modulation device tend to be larger than the areas of the other types. The illuminance of the white light in the center centering on an optical axis on the incident surface of the light modulation device tends to be higher than the illuminance of the white light in the outer periphery of the incident surface.

In the seventh modification, positive power of the microlens 42 disposed in the outer periphery of the lens array 40 is stronger than positive power of the microlens 42 disposed in the center of the lens array 40. Therefore, the illuminance of color light transmitted through the color filter of the color filter 52 and color light made incident on the sub-pixel electrode of the pixel electrode 62 of the light modulation device 50 corresponding to the microlens 42 disposed in the outer periphery is relatively lower than the illuminance of color light transmitted through the color filter and color light made incident on the sub-pixel electrode corresponding to the microlens 42 disposed in the center. Therefore, in the seventh modification, when the illuminance of the center centering on the optical axis AX of the white light WL2 emitted to the lens array 40 is relatively higher than the illuminance in the outer periphery and an illuminance difference of the white light WL2 between the center and the outer periphery is large, the illuminance difference of the white light WL2 is reduced by a difference in positive power of the microlens 42 between the center and the outer periphery. Therefore, in the seventh modification, even when the illuminance in the center of the white light WL2 emitted to the lens array 40 is higher than the illuminance in the outer periphery, it is possible to uniformize illuminance distributions on the XY plane centering on the optical axis AX of the image lights IM1 and IM2 emitted from the light modulation device 50.

Note that, in the seventh modification, on each of the X axis and the Y axis, the curvature radius of the incident surfaces 44a of the first lens 44B, the second lens 44G, and the third lens 44R in the center of the lens array 40 centering on the optical axis AX may be equal to the curvature radius of the incident surfaces 44a of the first lens 44B, the second lens 44G, and the third lens 44R in the outer periphery of the lens array 40. In that case, a refractive index of the material of the first lens 44B, the second lens 44G, and the third lens 44R in the center of the lens array 40 is higher than a refractive index of the material of the first lens 44B, the second lens 44G, and the third lens 44R in the outer periphery of the lens array 40. Consequently, the positive power of the microlens 42 disposed in the outer periphery of the lens array 40 becomes stronger than the positive power of the microlens 42 disposed in the center of the lens array 40. It is possible to uniformize illuminance distributions on the XY plane of the image lights IM1 and IM2 emitted from the light modulation device 50.

The preferred embodiment of the present disclosure is explained in detail above. However, the present disclosure is not limited to such a specific embodiment. Various modifications and changes are possible within the scope of the gist of the present disclosure described in the claims.

For example, in the projector 301 in the embodiment explained above, the shapes, the widths XR, XG, and XG, and the width YR, YG, and YB of the red filters 54R, the green filters 54G, and the blue filters 54B viewed along the Z axis are equal to one another in the color filter 52 of the light modulation device 50. In the projector 301 in the embodiment explained above, the red filters 54R, the green filters 54G, and the blue filters 54B are disposed in a so-called stripe form. However, the shape and the area of each of the red filters 54R, the green filters 54G, and the blue filters 54B and relative disposition of the color filters in the color filter 52 are not limited to specific types and may be changed as appropriate.

For example, in the color filter 52 of the light modulation device 50, the red filters 54R, the green filters 54G, and the blue filters 54B may be disposed in, for example, a mosaic form, a pentile form, a diamond pentile form, or any form other than these forms. Irrespective of in which form the red filters 54R, the green filters 54G, and the blue filters 54B are disposed, disposition including presence or absence and width of a light blocking region only have to be considered and the areas of the incident surface 44a and the emission surface 44b of the second lens 44G of the lens array 40 only have to be larger than the area of the incident surface 54a of the green filter 54G of the color filter 52 and larger than the areas of the incident surface 44a and the emission surface 44b of each of the first lens 44B and the third lens 44R. According to the relative disposition of the red filter 54R, the green filter 54G, and the blue filter 54B and the third lens 44R, the second lens 44G, and the first lens 44B, the second lens 44G may have eccentricity and at least one of the first lens 44B and the third lens 44R may not have eccentricity.

In the projector 301 in the embodiment explained above, the optical axis AX of the white lights WL1 and WL2 and the image lights IM1 and IM2 between the light source device 10 and the projection optical system 90 is parallel to the Z axis and the components are linearly disposed along the Z axis. However, the optical axis AX may be refracted as appropriate according to restrictions in design, an installation environment, and the like of the projector 301.

SUMMARY OF THE PRESENT DISCLOSURE

A summary of the present disclosure is noted below.

Note 1

A projector includes: a light source device configured to emit white light including blue light, green light, and red light; a lens array disposed on an optical path of the white light emitted from the light source device and including a plurality of lenses; a color filter disposed on an optical path of the white light emitted from the lens array and including a blue filter configured to transmit the blue light, a green filter configured to transmit the green light, and a red filter configured to transmit the red light; a pixel electrode disposed to face the color filter and including a blue sub-pixel electrode configured to modulate the blue light transmitted through the blue filter according to image information and emit blue image light, a green sub-pixel electrode configured to modulate the green light transmitted through the green filter according to the image information and emit green image light, and a red sub-pixel electrode configured to modulate the red light transmitted through the red filter according to the image information and emit red image light; and a projection optical system disposed on traveling paths of the blue image light, the green image light, and the red image light and configured to project the blue image light, the green image light, and the red image light. The plurality of lenses include a first lens that emits the white light toward the blue filter, a second lens that emits the white light toward the green filter, and a third lens that emits the white light toward the red filter. An area of the second lens is larger than an area of the green filter and is larger than an area of the first lens and an area of the third lens.

With the configuration of Note 1, a light amount of the green image light included in the image light emitted from the light modulation device can be increased to be larger than light amounts of the blue image light and the red image light. With the configuration of Note 1, it is possible to adjust illuminance ratios of red, green, and blue image lights in an image and a video to be projected to the visibility of a human observing the image and the video and realize an image and a video that are more brightly visually recognized than an image and a video projected by the projector of the related art.

Note 2

In the projector of Note 1, the first lens, the second lens, and the third lens may be disposed along a second axis in a plane crossing a first axis parallel to an optical axis of the white light made incident on the lens array and a third axis orthogonal to the second axis, and, on the second axis, width of the second lens may be larger than width of the first lens and width of the third lens.

With the configuration of Note 2, on the second axis, a light amount of the white light taken into the second lens can be increased to be larger than a light amount of the white light taken into each of the first lens and the third lens.

Note 3

In the projector of Note 2, on the third axis, the width of the second lens may be larger than the width of the first lens and the width of the third lens.

With the configuration of Note 3, on the third axis in addition to the second axis, the light amount of the white light taken into the second lens can be increased to be larger than the light amount of the white light taken into each of the first lens and the third lens.

Note 4

In the projector of any one of Notes 1 to 3, the first lens, the second lens, and the third lens may be disposed along a second axis in a plane crossing a first axis parallel to an optical axis of the white light made incident on the lens array and a third axis orthogonal to the second axis, and, on the third axis, width of the second lens may be larger than width of the first lens and width of the third lens.

With the configuration of Note 4, on the third axis, a light amount of the white light taken into the second lens can be increased to be larger than a light amount of the white light taken into each of the first lens and the third lens.

Note 5

In the projector of Note 1, when viewed along a first axis parallel to an optical axis of the white light made incident on the lens array, a part of the second lens may overlap at least one filter of the blue filter and the red filter.

With the configuration of Note 5, a light amount of the white light made incident on the green filter increases according to an area of a part of the second lens and a light amount of the white light made incident on at least one of the red filter and the blue filter decreases. With the configuration of Note 5, a difference between a light amount of the green light transmitted through the green filter and at least one of a light amount of the red light transmitted through the red filter and a light amount of the blue light transmitted through the blue filter can be easily adjusted.

Note 6

In the projector of any one of Notes 1 to 5, when viewed along a first axis parallel to an optical axis of the white light made incident on the lens array, a portion overlapping the green filter in the second lens may not have power, and a portion not overlapping the green filter in the second lens may have positive power.

In the configuration of Note 6, the white light made incident on the portion overlapping the green filter when viewed along the first axis in the second lens travels along the first axis and is made incident on the green filter. The white light made incident on the portion not overlapping the green filter when viewed along the first axis in the second lens is made incident on the green filter while being condensed on the first axis. In both of the white lights, the green light transmitted through the green filter is made incident on a green sub-pixel electrode of the pixel electrode. Therefore, with the configuration of Note 6, as in a configuration in which the entire second lens has positive power, the green light can be efficiently made incident on the green sub-pixel electrode. With the configuration of Note 6, a reduction in the thickness of the second lens can be achieved compared with when the entire second lens has positive power. With the configuration of Note 6, since the intensity of light made incident on the green sub-pixel electrode can be dispersed in the entire sub-pixel electrode, it is possible to reduce a load due to the green light locally having high light intensity in the sub-pixel electrode.

Note 7

In the projector of any one of Notes 1 to 5, the color filter may include, between any filters among the red filter, the green filter, and the blue filter adjacent to one another, a light blocking region for blocking the white light.

In the configuration of Note 7, when viewed along the Z axis, width of each of the first lens, the second lens, and the third lens can be set such that the end portion of each of the first lens, the second lens, and the third lens overlaps the light blocking region. Consequently, the white light emitted to the light blocking region and not utilized as the image light when the first lens, the second lens, and the third lens are absent can be allowed to pass through the blue filter, the green filter, and the red filter using the lenses and made incident on the blue sub-pixel electrode, the green sub-pixel electrode, and the red sub-pixel electrode to increase light amounts of the color lights converted into the image light in the sub-pixel electrodes. With the configuration of Note 7, it is possible to increase flexibility of adjustment of a spectrum in the image light emitted from the light modulation device and projected.

Note 8

In the projector of Note 7, the red filter, the green filter, and the blue filter may be disposed along a second axis in a plane crossing a first axis parallel to an optical axis of the white light made incident on the color filter and a third axis orthogonal to the second axis, the light blocking region may be disposed in a region extending in parallel to the third axis between any lenses among the first lens, the second lens, and the third lens adjacent to one another on the second axis, a region extending in parallel to the second axis between any lenses among the first lens, the second lens, and the third lens adjacent to one another on the third axis, and a region extending in parallel to the second axis and a region extending in parallel to the third axis at a peripheral edge portion of the color filter, width along the third axis of the light blocking region extending in parallel to the second axis may be larger than width along the second axis of the light blocking region extending in parallel to the third axis, and the first lens, the second lens, and the third lens may have power on the third axis.

With the configuration of Note 8, an adjustable width on the third axis of each of the first lens, the second lens, and the third lens can be secured larger than an adjustable width on the second axis. With the configuration of Note 8, when viewed along the first axis, the white light made incident on a region, which overlaps the light blocking region more widely than width along the second axis, along the third axis in the color filter can be taken into each of the first lens, the second lens, and the third lens and condensed on the blue filter, the green filter, and the red filter of the color filter and the blue sub-pixel electrode, the green sub-pixel electrode, and the red sub-pixel electrode of the pixel electrode. As a result, brightness of the image light emitted from the light modulation device is improved.

Note 9

In the projector of any one of Notes 1 to 8, when viewed along a first axis parallel to an optical axis of the white light made incident on the lens array, a principal point of the first lens may overlap a center of the blue filter, a principal point of the second lens may overlap a center of the green filter, and a principal point of the third lens may overlap a center of the red filter.

With the configuration of Note 9, the blue light included in the white light emitted from the first lens can be efficiently made incident on the blue sub-pixel electrode. The green light included in the white light emitted from the second lens can be efficiently made incident on the green sub-pixel electrode. The red light included in the white light emitted from the third lens can be efficiently made incident on the red sub-pixel electrode. As a result, brightness of the image light emitted from the light modulation device is improved.

What is claimed is:

1. A projector comprising:
   a light source device configured to emit white light including blue light, green light, and red light;
   a lens array disposed on an optical path of the white light emitted from the light source device and including a plurality of lenses;
   a color filter disposed on an optical path of the white light emitted from the lens array and including a blue filter configured to transmit the blue light, a green filter configured to transmit the green light, and a red filter configured to transmit the red light;
   a pixel electrode disposed to face the color filter and including a blue sub-pixel electrode configured to modulate the blue light transmitted through the blue filter according to image information and emit blue image light, a green sub-pixel electrode configured to modulate the green light transmitted through the green filter according to the image information and emit green image light, and a red sub-pixel electrode configured to modulate the red light transmitted through the red filter according to the image information and emit red image light; and
   a projection optical system disposed on traveling paths of the blue image light, the green image light, and the red image light and configured to project the blue image light, the green image light, and the red image light, wherein
   the plurality of lenses include a first lens that emits the white light toward the blue filter, a second lens that emits the white light toward the green filter, and a third lens that emits the white light toward the red filter, and
   an area of the second lens is larger than an area of the green filter and is larger than an area of the first lens and an area of the third lens.

2. The projector according to claim 1, wherein
   the first lens, the second lens, and the third lens are disposed along a second axis in a plane crossing a first axis parallel to an optical axis of the white light made incident on the lens array and a third axis orthogonal to the second axis, and
   on the second axis, width of the second lens is larger than width of the first lens and width of the third lens.

3. The projector according to claim 2, wherein, on the third axis, the width of the second lens is larger than the width of the first lens and the width of the third lens.

4. The projector according to claim 1, wherein
   the first lens, the second lens, and the third lens are disposed along a second axis in a plane crossing a first axis parallel to an optical axis of the white light made incident on the lens array and a third axis orthogonal to the second axis, and
   on the third axis, width of the second lens is larger than width of the first lens and width of the third lens.

5. The projector according to claim 1, wherein, when viewed along a first axis parallel to an optical axis of the white light made incident on the lens array, a part of the second lens overlaps at least one filter of the blue filter and the red filter.

6. The projector according to claim 1, wherein, when viewed along a first axis parallel to an optical axis of the white light made incident on the lens array, a portion overlapping the green filter in the second lens does not have power, and a portion not overlapping the green filter in the second lens has positive power.

7. The projector according to claim 1, wherein the color filter includes, between any filters among the red filter, the green filter, and the blue filter adjacent to one another, a light blocking region for blocking the white light.

8. The projector according to claim 7, wherein
   the red filter, the green filter, and the blue filter are disposed along a second axis in a plane crossing a first axis parallel to an optical axis of the white light made incident on the color filter and a third axis orthogonal to the second axis,
   the light blocking region is disposed in a region extending in parallel to the third axis between any lenses among the first lens, the second lens, and the third lens adjacent to one another on the second axis, a region extending in parallel to the second axis between any lenses among the first lens, the second lens, and the third lens adjacent to one another on the third axis, and a region extending in parallel to the second axis and a region extending in parallel to the third axis at a peripheral edge portion of the color filter,
   width on the third axis of the light blocking region extending in parallel to the second axis is larger than width on the second axis of the light blocking region extending in parallel to the third axis, and
   the first lens, the second lens, and the third lens have power on the third axis.

9. The projector according to claim 1, wherein, when viewed along a first axis parallel to an optical axis of the white light made incident on the lens array,
   a principal point of the first lens overlaps a center of the blue filter,
   a principal point of the second lens overlaps a center of the green filter, and
   a principal point of the third lens overlaps a center of the red filter.

* * * * *